(12) United States Patent
Manolakos et al.

(10) Patent No.: US 12,529,754 B2
(45) Date of Patent: Jan. 20, 2026

(54) MULTIPLE DOWNLINK POSITIONING TECHNIQUES CAPABILITY

(71) Applicant: QUALCOMM Incorporated, San Diego, CA (US)

(72) Inventors: Alexandros Manolakos, Escondido, CA (US); Sony Akkarakaran, Poway, CA (US); Lei Xiao, San Jose, CA (US); Guttorm Ringstad Opshaug, Redwood City, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 322 days.

(21) Appl. No.: 17/788,874

(22) PCT Filed: Jan. 14, 2021

(86) PCT No.: PCT/US2021/013343
§ 371 (c)(1),
(2) Date: Jun. 24, 2022

(87) PCT Pub. No.: WO2021/162819
PCT Pub. Date: Aug. 19, 2021

(65) Prior Publication Data
US 2023/0031427 A1 Feb. 2, 2023

(30) Foreign Application Priority Data
Feb. 12, 2020 (GR) .............................. 20200100069

(51) Int. Cl.
*G01S 5/02* (2010.01)
*G01S 5/00* (2006.01)
*H04W 64/00* (2009.01)

(52) U.S. Cl.
CPC .......... *G01S 5/0268* (2013.01); *G01S 5/0018* (2013.01); *H04W 64/003* (2013.01)

(58) Field of Classification Search
CPC .. G01S 5/0268; G01S 5/0018; H04W 64/003; Y02D 30/70
See application file for complete search history.

(56) References Cited

U.S. PATENT DOCUMENTS

| 8,626,926 B2 | 1/2014 | Burroughs et al. |
| 9,584,981 B2 | 2/2017 | Noorshams et al. |

(Continued)

FOREIGN PATENT DOCUMENTS

| JP | 2018100929 A | 6/2018 |
| WO | 2009108585 | 9/2009 |

(Continued)

OTHER PUBLICATIONS

International Search Report and Written Opinion—PCT/US2021/013343—ISA/EPO—Apr. 29, 2021.

(Continued)

*Primary Examiner* — Umair Ahsan
(74) *Attorney, Agent, or Firm* — Sunstein LLP/QUALCOMM Incorporated

(57) ABSTRACT

A user equipment (UE) includes: a transceiver configured to receive positioning signals; a memory; and a processor, communicatively coupled to the transceiver and the memory, configured to: send, via the transceiver to a network entity, a capability indication that includes a first positioning-method indication indicating that the processor supports simultaneous processing of a first combination of positioning methods; and simultaneously process one or more first positioning signals in accordance with the first combination of positioning methods to determine first position information for the UE.

38 Claims, 8 Drawing Sheets

(56) References Cited

U.S. PATENT DOCUMENTS

| | | | |
|---|---|---|---|
| 10,327,109 B1* | 6/2019 | Maheshwari | H04W 4/029 |
| 2009/0253440 A1 | 10/2009 | Edge | |
| 2014/0347648 A1 | 11/2014 | Roberts | |
| 2016/0095092 A1 | 3/2016 | Khoryaev et al. | |
| 2017/0251502 A1* | 8/2017 | Wachter | H04W 64/003 |
| 2017/0269190 A1* | 9/2017 | Henriksson | G01S 5/0242 |
| 2018/0310237 A1 | 10/2018 | Kumar et al. | |
| 2019/0182795 A1* | 6/2019 | Haartsen | H04W 8/005 |
| 2019/0230475 A1* | 7/2019 | Edge | G01S 5/0236 |
| 2021/0072340 A1* | 3/2021 | Wang | G01S 5/0215 |

FOREIGN PATENT DOCUMENTS

| | | |
|---|---|---|
| WO | 2016032678 | 3/2016 |
| WO | 2018025794 A1 | 2/2018 |
| WO | 2019143437 A1 | 7/2019 |

OTHER PUBLICATIONS

Taiwan Search Report—TW110101670—TIPO—Jun. 27, 2024.
Intel Corporation: "Summary on LPP for Agenda 6.8.2.3", 3GPP TSG-RAN WG2 Meeting #109 electronic, R2-2001173, Elbonia, Feb. 24, 2020-Mar. 6, 2020, 13 Pages, Mar. 16, 2020, Feb. 23, 2020.
Keating R., et al., "Overview of Positioning in 5G New Radio", 2019, 16th International Symposium on Wireless Communication Systems, IEEE, Oct. 21, 2019, pp. 320-324, Sep. 17, 2024.

* cited by examiner

FIG. 7

| Frequency band | Positioning methods (DL-TDOA, AoD, AoA, multi-RTT) | | Position-processing capabilities | |
|---|---|---|---|---|
| Band 1 | (0, 1, 0, 0) | 721 | $X1_1 - X7_1$ | 731 |
| | (1, 0, 0, 0) | 722 | $X1_2 - X7_2$ | 732 |
| | (1, 1, 0, 0) | 723 | $X1_3 - X7_3$ | 733 |
| Band 2 | (0, 0, 0, 1) | 724 | $X1_4 - X7_4$ | 734 |
| | (0, 1, 0, 1) | 725 | $X1_5 - X7_5$ | 735 |
| | | | $X1_6 - X7_6$ | 736 |

FIG. 8

| Frequency band combination | Positioning methods (DL-TDOA, AoD, AoA, multi-RTT) | | Position-processing capabilities | |
|---|---|---|---|---|
| FB1-FB2 | (0, 1, 0, 0) | 821 | $X1_7 - X7_7$ | 831 |
| | (1, 0, 0, 0) | 822 | | |
| | (1, 1, 0, 0) | 823 | | |
| FB1-FB3 | (0, 0, 0, 1) | 824 | $X1_8 - X7_8$ | 832 |
| | (0, 1, 0, 1) | 825 | $X1_9 - X7_9$ | 833 |
| | | | $X1_{10} - X7_{10}$ | 834 |
| FB4-FB5-FB6 | (1, 0, 0, 0) | 826 | $X1_{11} - X7_{11}$ | 835 |
| | (0, 0, 0, 1) | 827 | $X1_{12} - X7_{12}$ | 836 |

MULTIPLE DOWNLINK POSITIONING TECHNIQUES CAPABILITY

CROSS-REFERENCE TO RELATED APPLICATIONS

This application is the National Stage of International Application No. PCT/US2021/013343, filed Jan. 14, 2021, entitled "MULTIPLE DOWNLINK POSITIONING TECHNIQUES CAPABILITY," which claims the benefit of Greek Patent application No. 20200100069, filed Feb. 12, 2020, entitled "MULTIPLE DOWNLINK POSITIONING TECHNIQUES CAPABILITY," both of which are assigned to the assignee hereof, and the entire contents of which are hereby incorporated herein by reference for all purposes.

BACKGROUND

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service, a fourth-generation (4G) service (e.g., Long Term Evolution (LTE) or WiMax), a fifth-generation (5G) service, etc. There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Time Division Multiple Access (TDMA), the Global System for Mobile access (GSM) variation of TDMA, etc.

A fifth generation (5G) mobile standard calls for higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G standard. Furthermore, signaling efficiencies should be enhanced and latency should be substantially reduced compared to current standards.

SUMMARY

In an embodiment, a user equipment (UE) includes: a transceiver configured to receive positioning signals; a memory; and a processor, communicatively coupled to the transceiver and the memory, configured to: send, via the transceiver to a network entity, a capability indication that includes a first positioning-method indication indicating that the processor supports simultaneous processing of a first combination of positioning methods; and simultaneously process one or more first positioning signals in accordance with the first combination of positioning methods to determine first position information for the UE.

Implementations of such a UE may include one or more of the following features. The capability indication includes a first band indication indicating a first frequency band to which the first positioning-method indication is applicable. The capability indication includes: a second positioning-method indication indicating that the processor supports simultaneous processing of a second combination of positioning methods; and a second band indication indicating a second frequency band to which the second positioning-method indication is applicable; where the processor is configured to simultaneously process one or more second positioning signals in accordance with the second combination of positioning methods to determine second position information for the UE. The processor is configured to report to the network entity that the second position information for the UE includes one or more measurements corresponding to the second combination of positioning methods.

Also or alternatively, implementations of such a UE may include one or more of the following features. The capability indication indicates position-processing capabilities of the UE corresponding to the first combination of positioning methods. The capability indication includes a first position-processing capabilities indication, corresponding to a first positioning method of the first combination of positioning methods, and a second position-processing capabilities indication, corresponding to a second positioning method of the first combination of positioning methods. The first combination of positioning methods includes a first positioning method and a second positioning method, and the capability indication includes a third positioning-method indication indicating a third positioning method that the processor is configured to implement without simultaneously implementing the first positioning method or the second positioning method. The first positioning method, the second positioning method, and the third positioning method are all different positioning methods.

Also or alternatively, implementations of such a UE may include one or more of the following features. The capability indication includes a first band-combination indication indicating a first carrier aggregation frequency band combination to which the first positioning-method indication is applicable. The capability indication includes: a second positioning-method indication indicating that the processor supports simultaneous processing of a second combination of positioning methods; and a second band-combination indication indicating a second carrier aggregation frequency band combination to which the second positioning-method indication is applicable. The first combination of positioning methods includes a first positioning method and a second positioning method, and the capability indication indicates position-processing capabilities of the UE corresponding to each of the first positioning method and the second positioning method. The first combination of positioning methods includes a first positioning method and a second positioning method, and the capability indication indicates position-processing capabilities of the UE corresponding to the first positioning method and the second positioning method combined. The first combination of positioning methods includes a first positioning method and a second positioning method, and the capability indication indicates first position-processing capabilities of the UE corresponding to the first positioning method and second position-processing capabilities of the UE corresponding to the second positioning method.

Also or alternatively, implementations of such a UE may include one or more of the following features. The first combination of positioning methods includes at least two of downlink time difference of arrival (DL-TDOA), angle of departure (AoD), angle of arrival (AoA), and multiple round-trip time (multi-RTT). The first combination of positioning methods includes AoD and DL-TDOA, the capability indication includes a second positioning-method indication indicating that the processor supports simultaneous processing of a second combination of positioning methods, and the second combination of positioning methods includes multi-RTT and AoD. The processor is configured to report to the network entity that the first position information for the UE corresponds to the first combination of positioning methods.

In an embodiment, a method of determining position information includes: sending, from a user equipment (UE) to a network entity, a capability indication that includes a first positioning-method indication indicating that the UE supports simultaneous processing of a first combination of positioning methods; and simultaneously processing one or more first positioning signals in accordance with the first combination of positioning methods to determine first position information for the UE.

Implementations of such a method may include one or more of the following features. The capability indication includes a first band indication indicating a first frequency band to which the first positioning-method indication is applicable. The capability indication includes: a second positioning-method indication indicating that the UE supports simultaneous processing of a second combination of positioning methods; and a second band indication indicating a second frequency band to which the second positioning-method indication is applicable. The method includes: simultaneously processing one or more second positioning signals in accordance with the second combination of positioning methods to determine second position information for the UE; and reporting to the network entity that the second position information for the UE includes one or more measurements corresponding to the second combination of positioning methods.

Also or alternatively, implementations of such a method may include one or more of the following features. The capability indication indicates position-processing capabilities of the UE corresponding to the first combination of positioning methods. The capability indication includes a first position-processing capabilities indication, corresponding to a first positioning method of the first combination of positioning methods, and a second position-processing capabilities indication, corresponding to a second positioning method of the first combination of positioning methods. The first combination of positioning methods includes a first positioning method and a second positioning method, and the capability indication includes a third positioning-method indication indicating a third positioning method that the UE is configured to implement without simultaneously implementing the first positioning method or the second positioning method. The first positioning method, the second positioning method, and the third positioning method are all different positioning methods.

Also or alternatively, implementations of such a method may include one or more of the following features. The capability indication includes a first band-combination indication indicating a first carrier aggregation frequency band combination to which the first positioning-method indication is applicable. The capability indication includes: a second positioning-method indication indicating that the UE supports simultaneous processing of a second combination of positioning methods; and a second band-combination indication indicating a second carrier aggregation frequency band combination to which the second positioning-method indication is applicable. The first combination of positioning methods includes a first positioning method and a second positioning method, and the capability indication indicates position-processing capabilities of the UE corresponding to each of the first positioning method and the second positioning method. The first combination of positioning methods includes a first positioning method and a second positioning method, and the capability indication indicates position-processing capabilities of the UE corresponding to the first positioning method and the second positioning method combined. The first combination of positioning methods includes a first positioning method and a second positioning method, and the capability indication indicates first position-processing capabilities of the UE corresponding to the first positioning method and second position-processing capabilities of the UE corresponding to the second positioning method.

Also or alternatively, implementations of such a method may include one or more of the following features. The first combination of positioning methods includes at least two of downlink time difference of arrival (DL-TDOA), angle of departure (AoD), angle of arrival (AoA), and multiple round-trip time (multi-RTT). The first combination of positioning methods includes AoD and DL-TDOA, the capability indication includes a second positioning-method indication indicating that the UE supports simultaneous processing of a second combination of positioning methods, and the second combination of positioning methods includes multi-RTT and AoD. The method includes reporting to the network entity that the first position information for the UE corresponds to the first combination of positioning methods. The network entity is a location server.

In an embodiment, a UE includes: capability means for sending, to a network entity, a capability indication that includes a first positioning-method indication indicating that the UE supports simultaneous processing of a first combination of positioning methods; and positioning means for simultaneously processing one or more first positioning signals in accordance with the first combination of positioning methods to determine first position information for the UE.

Implementations of such a UE may include one or more of the following features. The capability indication includes a first band indication indicating a first frequency band to which the first positioning-method indication is applicable. The capability indication includes: second positioning-method indication indicating that the UE supports simultaneous processing of a second combination of positioning methods; and a second band indication indicating a second frequency band to which the second positioning-method indication is applicable; where the positioning means include means for simultaneously processing one or more second positioning signals in accordance with the second combination of positioning methods to determine second position information for the UE. The UE includes means for reporting to the network entity that the second position information for the UE includes one or more measurements corresponding to the second combination of positioning methods.

Also or alternatively, implementations of such a UE may include one or more of the following features. The capability indication indicates position-processing capabilities of the UE corresponding to the first combination of positioning methods. The capability indication includes a first position-processing capabilities indication, corresponding to a first positioning method of the first combination of positioning methods, and a second position-processing capabilities indication, corresponding to a second positioning method of the first combination of positioning methods. The first combination of positioning methods includes a first positioning method and a second positioning method, and the capability indication includes a third positioning-method indication indicating a third positioning method that the UE is configured to implement without simultaneously implementing the first positioning method or the second positioning method. The first positioning method, the second positioning method, and the third positioning method are all different positioning methods.

Also or alternatively, implementations of such a UE may include one or more of the following features. The capability indication includes a first band-combination indication indicating a first carrier aggregation frequency band combination to which the first positioning-method indication is applicable. The capability indication includes: a second positioning-method indication indicating that the UE supports simultaneous processing of a second combination of positioning methods; and a second band-combination indication indicating a second carrier aggregation frequency band combination to which the second positioning-method indication is applicable. The first combination of positioning methods includes a first positioning method and a second positioning method, and the capability indication indicates position-processing capabilities of the UE corresponding to each of the first positioning method and the second positioning method. The first combination of positioning methods includes a first positioning method and a second positioning method, and the capability indication indicates position-processing capabilities of the UE corresponding to the first positioning method and the second positioning method combined. The first combination of positioning methods includes a first positioning method and a second positioning method, and the capability indication indicates first position-processing capabilities of the UE corresponding to the first positioning method and second position-processing capabilities of the UE corresponding to the second positioning method.

Also or alternatively, implementations of such a UE may include one or more of the following features. The first combination of positioning methods includes at least two of downlink time difference of arrival (DL-TDOA), angle of departure (AoD), angle of arrival (AoA), and multiple round-trip time (multi-RTT). The first combination of positioning methods includes AoD and DL-TDOA, the capability indication includes a second positioning-method indication indicating that the UE supports simultaneous processing of a second combination of positioning methods, and the second combination of positioning methods includes multi-RTT and AoD. The UE includes means for reporting to the network entity that the first position information for the UE corresponds to the first combination of positioning methods.

In an embodiment, a non-transitory, processor-readable storage medium includes processor-readable instructions to cause a processor of a UE to: send, to a network entity, a capability indication that includes a first positioning-method indication indicating that the UE supports simultaneous processing of a first combination of positioning methods; and simultaneously process one or more first positioning signals in accordance with the first combination of positioning methods to determine first position information for the UE.

Implementations of such a storage medium may include one or more of the following features. The capability indication includes a first band indication indicating a first frequency band to which the first positioning-method indication is applicable. The capability indication includes: a second positioning-method indication indicating that the UE supports simultaneous processing of a second combination of positioning methods; and a second band indication indicating a second frequency band to which the second positioning-method indication is applicable; where the instructions include instructions to cause the processor to simultaneously process one or more second positioning signals in accordance with the second combination of positioning methods to determine second position information for the UE. The instructions include instructions to cause the processor to report to the network entity that the second position information for the UE includes one or more measurements corresponding to the second combination of positioning methods.

Also or alternatively, implementations of such a storage medium may include one or more of the following features. The capability indication indicates position-processing capabilities of the UE corresponding to the first combination of positioning methods. The capability indication includes a first position-processing capabilities indication, corresponding to a first positioning method of the first combination of positioning methods, and a second position-processing capabilities indication, corresponding to a second positioning method of the first combination of positioning methods. The first combination of positioning methods includes a first positioning method and a second positioning method, and the capability indication includes a third positioning-method indication indicating a third positioning method that the UE is configured to implement without simultaneously implementing the first positioning method or the second positioning method. The first positioning method, the second positioning method, and the third positioning method are all different positioning methods.

Also or alternatively, implementations of such a storage medium may include one or more of the following features. The capability indication includes a first band-combination indication indicating a first carrier aggregation frequency band combination to which the first positioning-method indication is applicable. The capability indication includes: a second positioning-method indication indicating that the processor supports simultaneous processing of a second combination of positioning methods; and a second band-combination indication indicating a second carrier aggregation frequency band combination to which the second positioning-method indication is applicable. The first combination of positioning methods includes a first positioning method and a second positioning method, and the capability indication indicates position-processing capabilities of the UE corresponding to each of the first positioning method and the second positioning method. The first combination of positioning methods includes a first positioning method and a second positioning method, and the capability indication indicates position-processing capabilities of the UE corresponding to the first positioning method and the second positioning method combined. The first combination of positioning methods includes a first positioning method and a second positioning method, and the capability indication indicates first position-processing capabilities of the UE corresponding to the first positioning method and second position-processing capabilities of the UE corresponding to the second positioning method.

Also or alternatively, implementations of such a storage medium may include one or more of the following features. The first combination of positioning methods includes at least two of downlink time difference of arrival (DL-TDOA), angle of departure (AoD), angle of arrival (AoA), and multiple round-trip time (multi-RTT). The first combination of positioning methods includes AoD and DL-TDOA, the capability indication includes a second positioning-method indication indicating that the processor supports simultaneous processing of a second combination of positioning methods, and the second combination of positioning methods includes multi-RTT and AoD. The instructions include instructions to cause the processor to report to the network entity that the first position information for the UE corresponds to the first combination of positioning methods.

BRIEF DESCRIPTION OF THE DRAWINGS

FIG. 7 is a simplified diagram of contents of a support message indicating supported positioning methods and corresponding frequency bands and processing capabilities.

FIG. 8 is a simplified diagram of contents of a support message indicating supported positioning methods and corresponding frequency band-combinations and processing capabilities.

DETAILED DESCRIPTION

Figure 1:
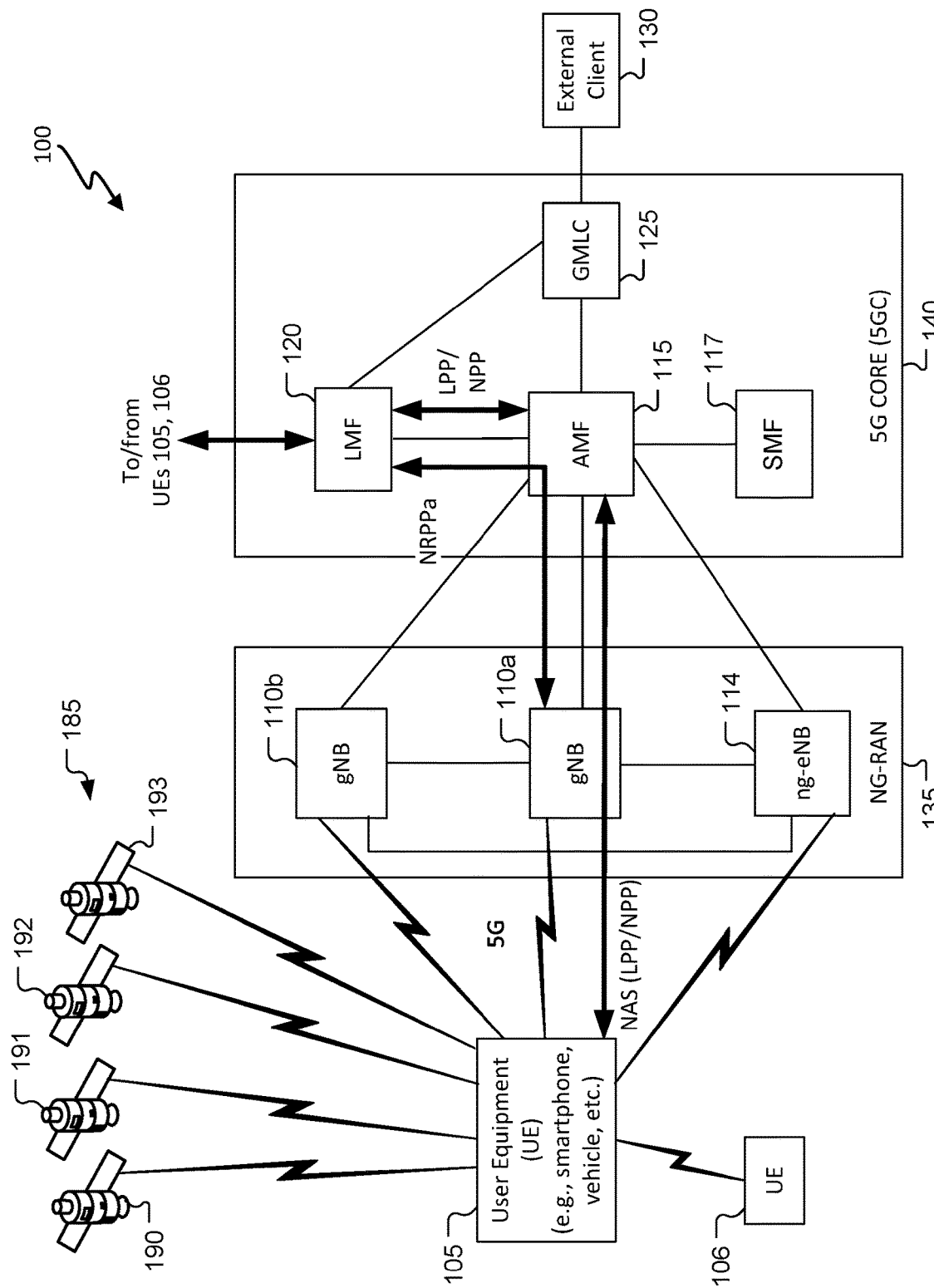
FIG. 1 is a simplified diagram of an example wireless communications system.

Techniques are discussed herein for reporting one or more supported positioning method combinations and corresponding frequency bands, or frequency-band combinations, and corresponding processing capabilities. A user equipment (UE) may provide information as to frequency bands and corresponding positioning methods that the UE supports, including combinations of positioning methods for which the UE supports simultaneous processing, i.e., may implement simultaneously. The UE may also, or alternatively, provide information as to frequency-band combinations and corresponding positioning methods that the UE supports, including combinations of positioning methods for which the UE supports simultaneous processing, i.e., may implement simultaneously. The UE may also provide indications of processing capabilities of the UE for the positioning methods when the frequency bands or the frequency-band combinations are in use. The UE may be able provide different capabilities for the methods based on the bands or band combinations. A server may be able to use the information provided by the UE to select (possibly change) a positioning signal configuration to increase positioning processing capability of the UE. A frequency-band combination may be requested (e.g., by the UE or the server) to help increase positioning processing capability of the UE. Other configurations, however, may be used.

Items and/or techniques described herein may provide one or more of the following capabilities, as well as other capabilities not mentioned. Positioning processing capability utilization of a user equipment may be improved. Power used for position determination of a UE may be more efficiently used, e.g., by reducing wasted energy providing positioning signals to a UE that the UE will not process, at least fully. Other capabilities may be provided and not every implementation according to the disclosure must provide any, let alone all, of the capabilities discussed.

Obtaining the locations of mobile devices that are accessing a wireless network may be useful for many applications including, for example, emergency calls, personal navigation, consumer asset tracking, locating a friend or family member, etc. Existing positioning methods include methods based on measuring radio signals transmitted from a variety of devices including satellite vehicles (SVs) and terrestrial radio sources in a wireless network such as base stations and access points. It is expected that standardization for the 5G wireless networks will include support for various positioning methods, which may utilize reference signals transmitted by base stations in a manner similar to which LTE wireless networks currently utilize Positioning Reference Signals (PRS) and/or Cell-specific Reference Signals (CRS) for position determination.

The description may refer to sequences of actions to be performed, for example, by elements of a computing device. Various actions described herein can be performed by specific circuits (e.g., an application specific integrated circuit (ASIC)), by program instructions being executed by one or more processors, or by a combination of both. Sequences of actions described herein may be embodied within a non-transitory computer-readable medium having stored thereon a corresponding set of computer instructions that upon execution would cause an associated processor to perform the functionality described herein. Thus, the various aspects described herein may be embodied in a number of different forms, all of which are within the scope of the disclosure, including claimed subject matter.

As used herein, the terms "user equipment" (UE) and "base station" are not specific to or otherwise limited to any particular Radio Access Technology (RAT), unless otherwise noted. In general, such UEs may be any wireless communication device (e.g., a mobile phone, router, tablet computer, laptop computer, a consumer asset tracking device, Internet of Things (IoT) device, etc.) used by a user to communicate over a wireless communications network. A UE may be mobile or may (e.g., at certain times) be stationary, and may communicate with a Radio Access Network (RAN). As used herein, the term "UE" may be referred to interchangeably as an "access terminal" or "AT," a "client device," a "wireless device," a "subscriber device," a "subscriber terminal," a "subscriber station," a "user terminal" or UT, a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, WiFi networks (e.g., based on IEEE 802.11, etc.) and so on.

A base station may operate according to one of several RATs in communication with UEs depending on the network in which it is deployed, and may be alternatively referred to as an Access Point (AP), a Network Node, a NodeB, an evolved NodeB (eNB), a general Node B (gNodeB, gNB), etc. In addition, in some systems a base station may provide purely edge node signaling functions while in other systems it may provide additional control and/or network management functions.

UEs may be embodied by any of a number of types of devices including but not limited to printed circuit (PC) cards, compact flash devices, external or internal modems, wireless or wireline phones, smartphones, tablets, consumer asset tracking devices, asset tags, and so on. A communication link through which UEs can send signals to a RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.). As used herein the term traffic channel (TCH) can refer to either an uplink/reverse or downlink/forward traffic channel.

As used herein, the term "cell" or "sector" may correspond to one of a plurality of cells of a base station, or to the base station itself, depending on the context. The term "cell" may refer to a logical communication entity used for communication with a base station (for example, over a carrier), and may be associated with an identifier for distinguishing neighboring cells (for example, a physical cell identifier (PCID), a virtual cell identifier (VCID)) operating via the same or a different carrier. In some examples, a carrier may support multiple cells, and different cells may be configured according to different protocol types (for example, machine-type communication (MTC), narrowband Internet-of-Things (NB-IoT), enhanced mobile broadband (eMBB), or others) that may provide access for different types of devices. In some examples, the term "cell" may refer to a portion of a geographic coverage area (for example, a sector) over which the logical entity operates.

Referring to FIG. 1, an example of a communication system 100 includes a UE 105, a UE 106, a Radio Access Network (RAN) 135, here a Fifth Generation (5G) Next Generation (NG) RAN (NG-RAN), and a 5G Core Network (5GC) 140. The UE 105 and/or the UE 106 may be, e.g., an IoT device, a location tracker device, a cellular telephone, a vehicle, or other device. A 5G network may also be referred to as a New Radio (NR) network; NG-RAN 135 may be referred to as a 5G RAN or as an NR RAN; and 5GC 140 may be referred to as an NG Core network (NGC). Standardization of an NG-RAN and 5GC is ongoing in the 3rd Generation Partnership Project (3GPP). Accordingly, the NG-RAN 135 and the 5GC 140 may conform to current or future standards for 5G support from 3GPP. The RAN 135 may be another type of RAN, e.g., a 3G RAN, a 4G Long Term Evolution (LTE) RAN, etc. The UE 106 may be configured and coupled similarly to the UE 105 to send and/or receive signals to/from similar other entities in the system 100, but such signaling is not indicated in FIG. 1 for the sake of simplicity of the figure. Similarly, the discussion focuses on the UE 105 for the sake of simplicity. The communication system 100 may utilize information from a constellation 185 of satellite vehicles (SVs) 190, 191, 192, 193 for a Satellite Positioning System (SPS) (e.g., a Global Navigation Satellite System (GNSS)) like the Global Positioning System (GPS), the Global Navigation Satellite System (GLONASS), Galileo, or Beidou or some other local or regional SPS such as the Indian Regional Navigational Satellite System (IRNSS), the European Geostationary Navigation Overlay Service (EGNOS), or the Wide Area Augmentation System (WAAS). Additional components of the communication system 100 are described below. The communication system 100 may include additional or alternative components.

As shown in FIG. 1, the NG-RAN 135 includes NR nodeBs (gNBs) 110a, 110b, and a next generation eNodeB (ng-eNB) 114, and the 5GC 140 includes an Access and Mobility Management Function (AMF) 115, a Session Management Function (SMF) 117, a Location Management Function (LMF) 120, and a Gateway Mobile Location Center (GMLC) 125. The gNBs 110a, 110b and the ng-eNB 114 are communicatively coupled to each other, are each configured to bi-directionally wirelessly communicate with the UE 105, and are each communicatively coupled to, and configured to bi-directionally communicate with, the AMF 115. The gNBs 110a, 110b, and the ng-eNB 114 may be referred to as base stations (BSs). The AMF 115, the SMF 117, the LMF 120, and the GMLC 125 are communicatively coupled to each other, and the GMLC is communicatively coupled to an external client 130. The SMF 117 may serve as an initial contact point of a Service Control Function (SCF) (not shown) to create, control, and delete media sessions. The BSs 110a, 110b, 114 may be a macro cell (e.g., a high-power cellular base station), or a small cell (e.g., a low-power cellular base station), or an access point (e.g., a short-range base station configured to communicate with short-range technology such as WiFi, WiFi-Direct (WiFi-D), Bluetooth®, Bluetooth®-low energy (BLE), Zigbee, etc. One or more of the BSs 110a, 110b, 114 may be configured to communicate with the UE 105 via multiple carriers. Each of the BSs 110a, 110b, 114 may provide communication coverage for a respective geographic region, e.g. a cell. Each cell may be partitioned into multiple sectors as a function of the base station antennas.

FIG. 1 provides a generalized illustration of various components, any or all of which may be utilized as appropriate, and each of which may be duplicated or omitted as necessary. Specifically, although only one UE 105 is illustrated, many UEs (e.g., hundreds, thousands, millions, etc.) may be utilized in the communication system 100. Similarly, the communication system 100 may include a larger (or smaller) number of SVs (i.e., more or fewer than the four SVs 190-193 shown), gNBs 110a, 110b, ng-eNBs 114, AMFs 115, external clients 130, and/or other components. The illustrated connections that connect the various components in the communication system 100 include data and signaling connections which may include additional (intermediary) components, direct or indirect physical and/or wireless connections, and/or additional networks. Furthermore, components may be rearranged, combined, separated, substituted, and/or omitted, depending on desired functionality.

While FIG. 1 illustrates a 5G-based network, similar network implementations and configurations may be used for other communication technologies, such as 3G, Long Term Evolution (LTE), etc. Implementations described herein (be they for 5G technology and/or for one or more other communication technologies and/or protocols) may be used to transmit (or broadcast) directional synchronization signals, receive and measure directional signals at UEs (e.g., the UE 105) and/or provide location assistance to the UE 105 (via the GMLC 125 or other location server) and/or compute a location for the UE 105 at a location-capable device such as the UE 105, the gNB 110a, 110b, or the LMF 120 based on measurement quantities received at the UE 105 for such directionally-transmitted signals. The gateway mobile location center (GMLC) 125, the location management function (LMF) 120, the access and mobility management function (AMF) 115, the SMF 117, the ng-eNB (eNodeB) 114 and the gNBs (gNodeBs) 110a, 110b are examples and may, in various embodiments, be replaced by or include various other location server functionality and/or base station functionality respectively.

The system 100 is capable of wireless communication in that components of the system 100 can communicate with one another (at least some times using wireless connections) directly or indirectly, e.g., via the BSs 110a, 110b, 114 and/or the network 140 (and/or one or more other devices not shown, such as one or more other base transceiver stations). For indirect communications, the communications may be altered during transmission from one entity to another, e.g., to alter header information of data packets, to change format, etc. The UE 105 may include multiple UEs and may be a mobile wireless communication device, but may communicate wirelessly and via wired connections. The UE 105 may be any of a variety of devices, e.g., a smartphone, a tablet computer, a vehicle-based device, etc., but these are examples only as the UE 105 is not required to be any of these configurations, and other configurations of UEs may be used. Other UEs may include wearable devices (e.g., smart watches, smart jewelry, smart glasses or headsets, etc.). Still other UEs may be used, whether currently existing or developed in the future. Further, other wireless devices (whether mobile or not) may be implemented within the system 100 and may communicate with each other and/or with the UE 105, the BSs 110a, 110b, 114, the core network 140, and/or the external client 130. For example, such other devices may include internet of thing (IoT) devices, medical devices, home entertainment and/or automation devices, etc. The core network 140 may communicate with the external client 130 (e.g., a computer system), e.g., to allow the external client 130 to request and/or receive location information regarding the UE 105 (e.g., via the GMLC 125).

The UE 105 or other devices may be configured to communicate in various networks and/or for various purposes and/or using various technologies (e.g., 5G, Wi-Fi communication, multiple frequencies of Wi-Fi communication, satellite positioning, one or more types of communications (e.g., GSM (Global System for Mobiles), CDMA (Code Division Multiple Access), LTE (Long-Term Evolution), V2X (Vehicle-to-Everything, e.g., V2P (Vehicle-to-Pedestrian), V2I (Vehicle-to-Infrastructure), V2V (Vehicle-to-Vehicle), etc.), IEEE 802.11p, etc.). V2X communications may be cellular (Cellular-V2X (C-V2X)) and/or WiFi (e.g., DSRC (Dedicated Short-Range Connection)). The system 100 may support operation on multiple carriers (waveform signals of different frequencies). Multi-carrier transmitters can transmit modulated signals simultaneously on the multiple carriers. Each modulated signal may be a Code Division Multiple Access (CDMA) signal, a Time Division Multiple Access (TDMA) signal, an Orthogonal Frequency Division Multiple Access (OFDMA) signal, a Single-Carrier Frequency Division Multiple Access (SC-FDMA) signal, etc. Each modulated signal may be sent on a different carrier and may carry pilot, overhead information, data, etc. The UEs 105, 106 may communicate with each other through UE-to-UE sidelink (SL) communications by transmitting over one or more sidelink channels such as a physical sidelink synchronization channel (PSSCH), a physical sidelink broadcast channel (PSBCH), or a physical sidelink control channel (PSCCH).

The UE 105 may comprise and/or may be referred to as a device, a mobile device, a wireless device, a mobile terminal, a terminal, a mobile station (MS), a Secure User Plane Location (SUPL) Enabled Terminal (SET), or by some other name. Moreover, the UE 105 may correspond to a cellphone, smartphone, laptop, tablet, PDA, consumer asset tracking device, navigation device, Internet of Things (IoT) device, asset tracker, health monitors, security systems, smart city sensors, smart meters, wearable trackers, or some other portable or moveable device. Typically, though not necessarily, the UE 105 may support wireless communication using one or more Radio Access Technologies (RATs) such as Global System for Mobile communication (GSM), Code Division Multiple Access (CDMA), Wideband CDMA (WCDMA), LTE, High Rate Packet Data (HRPD), IEEE 802.11 WiFi (also referred to as Wi-Fi), Bluetooth® (BT), Worldwide Interoperability for Microwave Access (WiMAX), 5G new radio (NR) (e.g., using the NG-RAN 135 and the 5GC 140), etc. The UE 105 may support wireless communication using a Wireless Local Area Network (WLAN) which may connect to other networks (e.g., the Internet) using a Digital Subscriber Line (DSL) or packet cable, for example. The use of one or more of these RATs may allow the UE 105 to communicate with the external client 130 (e.g., via elements of the 5GC 140 not shown in FIG. 1, or possibly via the GMLC 125) and/or allow the external client 130 to receive location information regarding the UE 105 (e.g., via the GMLC 125).

The UE 105 may include a single entity or may include multiple entities such as in a personal area network where a user may employ audio, video and/or data I/O (input/output) devices and/or body sensors and a separate wireline or wireless modem. An estimate of a location of the UE 105 may be referred to as a location, location estimate, location fix, fix, position, position estimate, or position fix, and may be geographic, thus providing location coordinates for the UE 105 (e.g., latitude and longitude) which may or may not include an altitude component (e.g., height above sea level, height above or depth below ground level, floor level, or basement level). Alternatively, a location of the UE 105 may be expressed as a civic location (e.g., as a postal address or the designation of some point or small area in a building such as a particular room or floor). A location of the UE 105 may be expressed as an area or volume (defined either geographically or in civic form) within which the UE 105 is expected to be located with some probability or confidence level (e.g., 67%, 95%, etc.). A location of the UE 105 may be expressed as a relative location comprising, for example, a distance and direction from a known location. The relative location may be expressed as relative coordinates (e.g., X, Y (and Z) coordinates) defined relative to some origin at a known location which may be defined, e.g., geographically, in civic terms, or by reference to a point, area, or volume, e.g., indicated on a map, floor plan, or building plan. In the description contained herein, the use of the term location may comprise any of these variants unless indicated otherwise. When computing the location of a UE, it is common to solve for local x, y, and possibly z coordinates and then, if desired, convert the local coordinates into absolute coordinates (e.g., for latitude, longitude, and altitude above or below mean sea level).

The UE 105 may be configured to communicate with other entities using one or more of a variety of technologies. The UE 105 may be configured to connect indirectly to one or more communication networks via one or more device-to-device (D2D) peer-to-peer (P2P) links. The D2D P2P links may be supported with any appropriate D2D radio access technology (RAT), such as LTE Direct (LTE-D), WiFi Direct (WiFi-D), Bluetooth®, and so on. One or more of a group of UEs utilizing D2D communications may be within a geographic coverage area of a Transmission/Reception Point (TRP) such as one or more of the gNBs 110a, 110b, and/or the ng-eNB 114. Other UEs in such a group may be outside such geographic coverage areas, or may be otherwise unable to receive transmissions from a base station. Groups of UEs communicating via D2D communications may utilize a one-to-many (1:M) system in which each UE may transmit to other UEs in the group. A TRP may facilitate scheduling of resources for D2D communications. In other cases, D2D communications may be carried out between UEs without the involvement of a TRP. One or more of a group of UEs utilizing D2D communications may be within a geographic coverage area of a TRP. Other UEs in such a group may be outside such geographic coverage areas, or be otherwise unable to receive transmissions from a base station. Groups of UEs communicating via D2D communications may utilize a one-to-many (1:M) system in which each UE may transmit to other UEs in the group. A TRP may facilitate scheduling of resources for D2D communications. In other cases, D2D communications may be carried out between UEs without the involvement of a TRP.

Base stations (BSs) in the NG-RAN 135 shown in FIG. 1 include NR Node Bs, referred to as the gNBs 110a and 110b. Pairs of the gNBs 110a, 110b in the NG-RAN 135 may be connected to one another via one or more other gNBs. Access to the 5G network is provided to the UE 105 via wireless communication between the UE 105 and one or more of the gNBs 110a, 110b, which may provide wireless communications access to the 5GC 140 on behalf of the UE 105 using 5G. In FIG. 1, the serving gNB for the UE 105 is assumed to be the gNB 110a, although another gNB (e.g. the gNB 110b) may act as a serving gNB if the UE 105 moves to another location or may act as a secondary gNB to provide additional throughput and bandwidth to the UE 105.

Base stations (BSs) in the NG-RAN 135 shown in FIG. 1 may include the ng-eNB 114, also referred to as a next generation evolved Node B. The ng-eNB 114 may be connected to one or more of the gNBs 110a, 110b in the NG-RAN 135, possibly via one or more other gNBs and/or one or more other ng-eNBs. The ng-eNB 114 may provide LTE wireless access and/or evolved LTE (eLTE) wireless access to the UE 105. One or more of the gNBs 110a, 110b and/or the ng-eNB 114 may be configured to function as positioning-only beacons which may transmit signals to assist with determining the position of the UE 105 but may not receive signals from the UE 105 or from other UEs.

The BSs 110a, 110b, 114 may each comprise one or more TRPs. For example, each sector within a cell of a BS may comprise a TRP, although multiple TRPs may share one or more components (e.g., share a processor but have separate antennas). The system 100 may include only macro TRPs or the system 100 may have TRPs of different types, e.g., macro, pico, and/or femto TRPs, etc. A macro TRP may cover a relatively large geographic area (e.g., several kilometers in radius) and may allow unrestricted access by terminals with service subscription. A pico TRP may cover a relatively small geographic area (e.g., a pico cell) and may allow unrestricted access by terminals with service subscription. A femto or home TRP may cover a relatively small geographic area (e.g., a femto cell) and may allow restricted access by terminals having association with the femto cell (e.g., terminals for users in a home).

As noted, while FIG. 1 depicts nodes configured to communicate according to 5G communication protocols, nodes configured to communicate according to other communication protocols, such as, for example, an LTE protocol or IEEE 802.11x protocol, may be used. For example, in an Evolved Packet System (EPS) providing LTE wireless access to the UE 105, a RAN may comprise an Evolved Universal Mobile Telecommunications System (UMTS) Terrestrial Radio Access Network (E-UTRAN) which may comprise base stations comprising evolved Node Bs (eNBs). A core network for EPS may comprise an Evolved Packet Core (EPC). An EPS may comprise an E-UTRAN plus EPC, where the E-UTRAN corresponds to the NG-RAN 135 and the EPC corresponds to the 5GC 140 in FIG. 1.

The gNBs 110a, 110b and the ng-eNB 114 may communicate with the AMF 115, which, for positioning functionality, communicates with the LMF 120. The AMF 115 may support mobility of the UE 105, including cell change and handover and may participate in supporting a signaling connection to the UE 105 and possibly data and voice bearers for the UE 105. The LMF 120 may communicate directly with the UE 105, e.g., through wireless communications, or directly with the BSs 110a, 110b, 114. The LMF 120 may support positioning of the UE 105 when the UE 105 accesses the NG-RAN 135 and may support position procedures/methods such as Assisted GNSS (A-GNSS), Observed Time Difference of Arrival (OTDOA) (e.g., Downlink (DL) OTDOA or Uplink (UL) OTDOA), Round Trip Time (RTT), Multi-Cell RTT, Real Time Kinematics (RTK), Precise Point Positioning (PPP), Differential GNSS (DGNSS), Enhanced Cell ID (E-CID), angle of arrival (AoA), angle of departure (AoD), and/or other position methods. The LMF 120 may process location services requests for the UE 105, e.g., received from the AMF 115 or from the GMLC 125. The LMF 120 may be connected to the AMF 115 and/or to the GMLC 125. The LMF 120 may be referred to by other names such as a Location Manager (LM), Location Function (LF), commercial LMF (CLMF), or value added LMF (VLMF). A node/system that implements the LMF 120 may additionally or alternatively implement other types of location-support modules, such as an Enhanced Serving Mobile Location Center (E-SMLC) or a Secure User Plane Location (SUPL) Location Platform (SLP). At least part of the positioning functionality (including derivation of the location of the UE 105) may be performed at the UE 105 (e.g., using signal measurements obtained by the UE 105 for signals transmitted by wireless nodes such as the gNBs 110a, 110b and/or the ng-eNB 114, and/or assistance data provided to the UE 105, e.g. by the LMF 120). The AMF 115 may serve as a control node that processes signaling between the UE 105 and the core network 140, and may provide QoS (Quality of Service) flow and session management. The AMF 115 may support mobility of the UE 105 including cell change and handover and may participate in supporting signaling connection to the UE 105.

The GMLC 125 may support a location request for the UE 105 received from the external client 130 and may forward such a location request to the AMF 115 for forwarding by the AMF 115 to the LMF 120 or may forward the location request directly to the LMF 120. A location response from the LMF 120 (e.g., containing a location estimate for the UE 105) may be returned to the GMLC 125 either directly or via the AMF 115 and the GMLC 125 may then return the location response (e.g., containing the location estimate) to the external client 130. The GMLC 125 is shown connected to both the AMF 115 and LMF 120, though only one of these connections may be supported by the 5GC 140 in some implementations.

As further illustrated in FIG. 1, the LMF 120 may communicate with the gNBs 110a, 110b and/or the ng-eNB 114 using a New Radio Position Protocol A (which may be referred to as NPPa or NRPPa), which may be defined in 3GPP Technical Specification (TS) 38.455. NRPPa may be the same as, similar to, or an extension of the LTE Positioning Protocol A (LPPa) defined in 3GPP TS 36.455, with NRPPa messages being transferred between the gNB 110a (or the gNB 110b) and the LMF 120, and/or between the ng-eNB 114 and the LMF 120, via the AMF 115. As further illustrated in FIG. 1, the LMF 120 and the UE 105 may communicate using an LTE Positioning Protocol (LPP), which may be defined in 3GPP TS 36.355. The LMF 120 and the UE 105 may also or instead communicate using a New Radio Positioning Protocol (which may be referred to as NPP or NRPP), which may be the same as, similar to, or an extension of LPP. Here, LPP and/or NPP messages may be transferred between the UE 105 and the LMF 120 via the AMF 115 and the serving gNB 110*a*, 110*b* or the serving ng-eNB 114 for the UE 105. For example, LPP and/or NPP messages may be transferred between the LMF 120 and the AMF 115 using a 5G Location Services Application Protocol (LCS AP) and may be transferred between the AMF 115 and the UE 105 using a 5G Non-Access Stratum (NAS) protocol. The LPP and/or NPP protocol may be used to support positioning of the UE 105 using UE-assisted and/or UE-based position methods such as A-GNSS, RTK, OTDOA and/or E-CID. The NRPPa protocol may be used to support positioning of the UE 105 using network-based position methods such as E-CID (e.g., when used with measurements obtained by the gNB 110*a*, 110*b* or the ng-eNB 114) and/or may be used by the LMF 120 to obtain location related information from the gNBs 110*a*, 110*b* and/or the ng-eNB 114, such as parameters defining directional SS transmissions from the gNBs 110*a*, 110*b*, and/or the ng-eNB 114. The LMF 120 may be co-located or integrated with a gNB or a TRP, or may be disposed remote from the gNB and/or the TRP and configured to communicate directly or indirectly with the gNB and/or the TRP.

With a UE-assisted position method, the UE 105 may obtain location measurements and send the measurements to a location server (e.g., the LMF 120) for computation of a location estimate for the UE 105. For example, the location measurements may include one or more of a Received Signal Strength Indication (RSSI), Round Trip signal propagation Time (RTT), Reference Signal Time Difference (RSTD), Reference Signal Received Power (RSRP) and/or Reference Signal Received Quality (RSRQ) for the gNBs 110*a*, 110*b*, the ng-eNB 114, and/or a WLAN AP. The location measurements may also or instead include measurements of GNSS pseudorange, code phase, and/or carrier phase for the SVs 190-193.

With a UE-based position method, the UE 105 may obtain location measurements (e.g., which may be the same as or similar to location measurements for a UE-assisted position method) and may compute a location of the UE 105 (e.g., with the help of assistance data received from a location server such as the LMF 120 or broadcast by the gNBs 110*a*, 110*b*, the ng-eNB 114, or other base stations or APs).

With a network-based position method, one or more base stations (e.g., the gNBs 110*a*, 110*b*, and/or the ng-eNB 114) or APs may obtain location measurements (e.g., measurements of RSSI, RTT, RSRP, RSRQ or Time Of Arrival (ToA) for signals transmitted by the UE 105) and/or may receive measurements obtained by the UE 105. The one or more base stations or APs may send the measurements to a location server (e.g., the LMF 120) for computation of a location estimate for the UE 105.

Information provided by the gNBs 110*a*, 110*b*, and/or the ng-eNB 114 to the LMF 120 using NRPPa may include timing and configuration information for directional SS transmissions and location coordinates. The LMF 120 may provide some or all of this information to the UE 105 as assistance data in an LPP and/or NPP message via the NG-RAN 135 and the 5GC 140.

An LPP or NPP message sent from the LMF 120 to the UE 105 may instruct the UE 105 to do any of a variety of things depending on desired functionality. For example, the LPP or NPP message could contain an instruction for the UE 105 to obtain measurements for GNSS (or A-GNSS), WLAN, E-CID, and/or OTDOA (or some other position method). In the case of E-CID, the LPP or NPP message may instruct the UE 105 to obtain one or more measurement quantities (e.g., beam ID, beam width, mean angle, RSRP, RSRQ measurements) of directional signals transmitted within particular cells supported by one or more of the gNBs 110*a*, 110*b*, and/or the ng-eNB 114 (or supported by some other type of base station such as an eNB or WiFi AP). The UE 105 may send the measurement quantities back to the LMF 120 in an LPP or NPP message (e.g., inside a 5G NAS message) via the serving gNB 110*a* (or the serving ng-eNB 114) and the AMF 115.

As noted, while the communication system 100 is described in relation to 5G technology, the communication system 100 may be implemented to support other communication technologies, such as GSM, WCDMA, LTE, etc., that are used for supporting and interacting with mobile devices such as the UE 105 (e.g., to implement voice, data, positioning, and other functionalities). In some such embodiments, the 5GC 140 may be configured to control different air interfaces. For example, the 5GC 140 may be connected to a WLAN using a Non-3GPP InterWorking Function (N3IWF, not shown FIG. 1) in the 5GC 150. For example, the WLAN may support IEEE 802.11 WiFi access for the UE 105 and may comprise one or more WiFi APs. Here, the N3IWF may connect to the WLAN and to other elements in the 5GC 140 such as the AMF 115. In some embodiments, both the NG-RAN 135 and the 5GC 140 may be replaced by one or more other RANs and one or more other core networks. For example, in an EPS, the NG-RAN 135 may be replaced by an E-UTRAN containing eNBs and the 5GC 140 may be replaced by an EPC containing a Mobility Management Entity (MME) in place of the AMF 115, an E-SMLC in place of the LMF 120, and a GMLC that may be similar to the GMLC 125. In such an EPS, the E-SMLC may use LPPa in place of NRPPa to send and receive location information to and from the eNBs in the E-UTRAN and may use LPP to support positioning of the UE 105. In these other embodiments, positioning of the UE 105 using directional PRSs may be supported in an analogous manner to that described herein for a 5G network with the difference that functions and procedures described herein for the gNBs 110*a*, 110*b*, the ng-eNB 114, the AMF 115, and the LMF 120 may, in some cases, apply instead to other network elements such eNBs, WiFi APs, an MME, and an E-SMLC.

As noted, in some embodiments, positioning functionality may be implemented, at least in part, using the directional SS beams, sent by base stations (such as the gNBs 110*a*, 110*b*, and/or the ng-eNB 114) that are within range of the UE whose position is to be determined (e.g., the UE 105 of FIG. 1). The UE may, in some instances, use the directional SS beams from a plurality of base stations (such as the gNBs 110*a*, 110*b*, the ng-eNB 114, etc.) to compute the UE's position.

Figure 2:
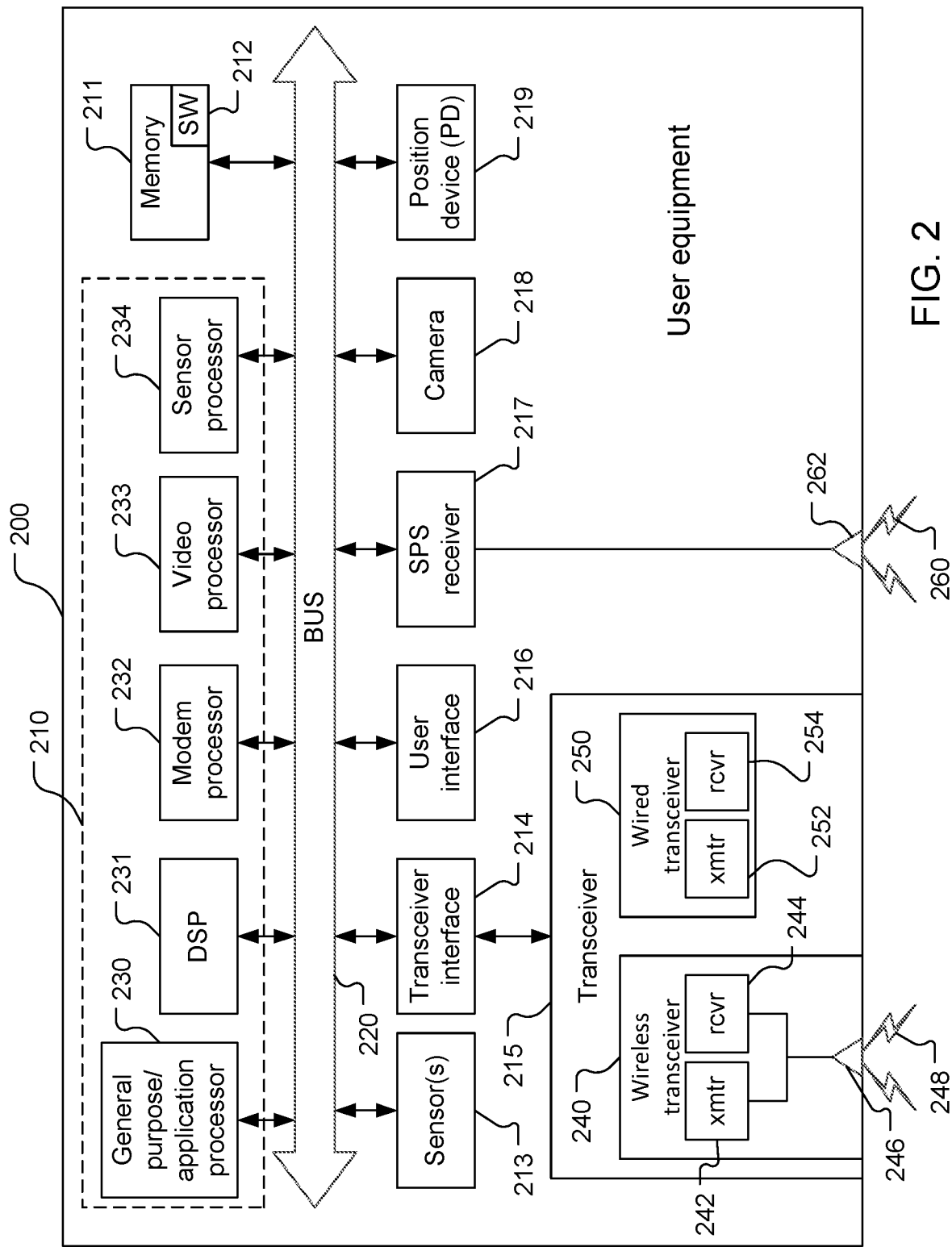
FIG. 2 is a block diagram of components of an example user equipment shown in FIG. 1.

Referring also to FIG. 2, a UE 200 is an example of one of the UEs 105, 106 and comprises a computing platform including a processor 210, memory 211 including software (SW) 212, one or more sensors 213, a transceiver interface 214 for a transceiver 215 (that includes a wireless transceiver 240 and a wired transceiver 250), a user interface 216, a Satellite Positioning System (SPS) receiver 217, a camera 218, and a position device (PD) 219. The processor 210, the memory 211, the sensor(s) 213, the transceiver interface 214, the user interface 216, the SPS receiver 217, the camera 218, and the position device 219 may be communicatively coupled to each other by a bus 220 (which may be configured, e.g., for optical and/or electrical communication). One or more of the shown apparatus (e.g., the camera 218, the position device 219, and/or one or more of the sensor(s) 213, etc.) may be omitted from the UE 200. The processor 210 may include one or more intelligent hardware devices, e.g., a central processing unit (CPU), a microcontroller, an application specific integrated circuit (ASIC), etc. The processor 210 may comprise multiple processors including a general-purpose/application processor 230, a Digital Signal Processor (DSP) 231, a modem processor 232, a video processor 233, and/or a sensor processor 234. One or more of the processors 230-234 may comprise multiple devices (e.g., multiple processors). For example, the sensor processor 234 may comprise, e.g., processors for radar, ultrasound, and/or lidar, etc. The modem processor 232 may support dual SIM/dual connectivity (or even more SIMs). For example, a SIM (Subscriber Identity Module or Subscriber Identification Module) may be used by an Original Equipment Manufacturer (OEM), and another SIM may be used by an end user of the UE 200 for connectivity. The memory 211 is a non-transitory storage medium that may include random access memory (RAM), flash memory, disc memory, and/or read-only memory (ROM), etc. The memory 211 stores the software 212 which may be processor-readable, processor-executable software code containing instructions that are configured to, when executed, cause the processor 210 to perform various functions described herein. Alternatively, the software 212 may not be directly executable by the processor 210 but may be configured to cause the processor 210, e.g., when compiled and executed, to perform the functions. The description may refer only to the processor 210 performing a function, but this includes other implementations such as where the processor 210 executes software and/or firmware. The description may refer to the processor 210 performing a function as shorthand for one or more of the processors 230-234 performing the function. The description may refer to the UE 200 performing a function as shorthand for one or more appropriate components of the UE 200 performing the function. The processor 210 may include a memory with stored instructions in addition to and/or instead of the memory 211. Functionality of the processor 210 is discussed more fully below.

The configuration of the UE 200 shown in FIG. 2 is an example and not limiting of the invention, including the claims, and other configurations may be used. For example, an example configuration of the UE includes one or more of the processors 230-234 of the processor 210, the memory 211, and the wireless transceiver 240. Other example configurations include one or more of the processors 230-234 of the processor 210, the memory 211, the wireless transceiver 240, and one or more of the sensor(s) 213, the user interface 216, the SPS receiver 217, the camera 218, the PD 219, and/or the wired transceiver 250.

The UE 200 may comprise the modem processor 232 that may be capable of performing baseband processing of signals received and down-converted by the transceiver 215 and/or the SPS receiver 217. The modem processor 232 may perform baseband processing of signals to be upconverted for transmission by the transceiver 215. Also or alternatively, baseband processing may be performed by the processor 230 and/or the DSP 231. Other configurations, however, may be used to perform baseband processing.

The UE 200 may include the sensor(s) 213 that may include, for example, one or more of various types of sensors such as one or more inertial sensors, one or more magnetometers, one or more environment sensors, one or more optical sensors, one or more weight sensors, and/or one or more radio frequency (RF) sensors, etc. An inertial measurement unit (IMU) may comprise, for example, one or more accelerometers (e.g., collectively responding to acceleration of the UE 200 in three dimensions) and/or one or more gyroscopes (e.g., three-dimensional gyroscope(s)). The sensor(s) 213 may include one or more magnetometers (e.g., three-dimensional magnetometer(s)) to determine orientation (e.g., relative to magnetic north and/or true north) that may be used for any of a variety of purposes, e.g., to support one or more compass applications. The environment sensor(s) may comprise, for example, one or more temperature sensors, one or more barometric pressure sensors, one or more ambient light sensors, one or more camera imagers, and/or one or more microphones, etc. The sensor(s) 213 may generate analog and/or digital signals indications of which may be stored in the memory 211 and processed by the DSP 231 and/or the processor 230 in support of one or more applications such as, for example, applications directed to positioning and/or navigation operations.

The sensor(s) 213 may be used in relative location measurements, relative location determination, motion determination, etc. Information detected by the sensor(s) 213 may be used for motion detection, relative displacement, dead reckoning, sensor-based location determination, and/or sensor-assisted location determination. The sensor(s) 213 may be useful to determine whether the UE 200 is fixed (stationary) or mobile and/or whether to report certain useful information to the LMF 120 regarding the mobility of the UE 200. For example, based on the information obtained/measured by the sensor(s), the UE 200 may notify/report to the LMF 120 that the UE 200 has detected movements or that the UE 200 has moved, and report the relative displacement/distance (e.g., via dead reckoning, or sensor-based location determination, or sensor-assisted location determination enabled by the sensor(s) 213). In another example, for relative positioning information, the sensors/IMU can be used to determine the angle and/or orientation of the other device with respect to the UE 200, etc.

The IMU may be configured to provide measurements about a direction of motion and/or a speed of motion of the UE 200, which may be used in relative location determination. For example, one or more accelerometers and/or one or more gyroscopes of the IMU may detect, respectively, a linear acceleration and a speed of rotation of the UE 200. The linear acceleration and speed of rotation measurements of the UE 200 may be integrated over time to determine an instantaneous direction of motion as well as a displacement of the UE 200. The instantaneous direction of motion and the displacement may be integrated to track a location of the UE 200. For example, a reference location of the UE 200 may be determined, e.g., using the SPS receiver 217 (and/or by some other means) for a moment in time and measurements from the accelerometer(s) and gyroscope(s) taken after this moment in time may be used in dead reckoning to determine present location of the UE 200 based on movement (direction and distance) of the UE 200 relative to the reference location.

The magnetometer(s) may determine magnetic field strengths in different directions which may be used to determine orientation of the UE 200. For example, the orientation may be used to provide a digital compass for the UE 200. The magnetometer may be a two-dimensional magnetometer configured to detect and provide indications of magnetic field strength in two orthogonal dimensions. Alternatively, the magnetometer may be a three-dimensional magnetometer configured to detect and provide indications of magnetic field strength in three orthogonal dimensions. The magnetometer may provide means for sensing a magnetic field and providing indications of the magnetic field, e.g., to the processor 210.

The transceiver 215 may include a wireless transceiver 240 and a wired transceiver 250 configured to communicate with other devices through wireless connections and wired connections, respectively. For example, the wireless transceiver 240 may include a wireless transmitter 242 and a wireless receiver 244 coupled to one or more antennas 246 for transmitting (e.g., on one or more uplink channels and/or one or more sidelink channels) and/or receiving (e.g., on one or more downlink channels and/or one or more sidelink channels) wireless signals 248 and transducing signals from the wireless signals 248 to wired (e.g., electrical and/or optical) signals and from wired (e.g., electrical and/or optical) signals to the wireless signals 248. Thus, the wireless transmitter 242 may include multiple transmitters that may be discrete components or combined/integrated components, and/or the wireless receiver 244 may include multiple receivers that may be discrete components or combined/integrated components. The wireless transceiver 240 may be configured to communicate signals (e.g., with TRPs and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. New Radio may use mm-wave frequencies and/or sub-6 GHz frequencies. The wired transceiver 250 may include a wired transmitter 252 and a wired receiver 254 configured for wired communication, e.g., with the network 135. The wired transmitter 252 may include multiple transmitters that may be discrete components or combined/integrated components, and/or the wired receiver 254 may include multiple receivers that may be discrete components or combined/integrated components. The wired transceiver 250 may be configured, e.g., for optical communication and/or electrical communication. The transceiver 215 may be communicatively coupled to the transceiver interface 214, e.g., by optical and/or electrical connection. The transceiver interface 214 may be at least partially integrated with the transceiver 215.

The user interface 216 may comprise one or more of several devices such as, for example, a speaker, microphone, display device, vibration device, keyboard, touch screen, etc. The user interface 216 may include more than one of any of these devices. The user interface 216 may be configured to enable a user to interact with one or more applications hosted by the UE 200. For example, the user interface 216 may store indications of analog and/or digital signals in the memory 211 to be processed by DSP 231 and/or the general-purpose processor 230 in response to action from a user. Similarly, applications hosted on the UE 200 may store indications of analog and/or digital signals in the memory 211 to present an output signal to a user. The user interface 216 may include an audio input/output (I/O) device comprising, for example, a speaker, a microphone, digital-to-analog circuitry, analog-to-digital circuitry, an amplifier and/or gain control circuitry (including more than one of any of these devices). Other configurations of an audio I/O device may be used. Also or alternatively, the user interface 216 may comprise one or more touch sensors responsive to touching and/or pressure, e.g., on a keyboard and/or touch screen of the user interface 216.

The SPS receiver 217 (e.g., a Global Positioning System (GPS) receiver) may be capable of receiving and acquiring SPS signals 260 via an SPS antenna 262. The antenna 262 is configured to transduce the wireless signals 260 to wired signals, e.g., electrical or optical signals, and may be integrated with the antenna 246. The SPS receiver 217 may be configured to process, in whole or in part, the acquired SPS signals 260 for estimating a location of the UE 200. For example, the SPS receiver 217 may be configured to determine location of the UE 200 by trilateration using the SPS signals 260. The general-purpose processor 230, the memory 211, the DSP 231 and/or one or more specialized processors (not shown) may be utilized to process acquired SPS signals, in whole or in part, and/or to calculate an estimated location of the UE 200, in conjunction with the SPS receiver 217. The memory 211 may store indications (e.g., measurements) of the SPS signals 260 and/or other signals (e.g., signals acquired from the wireless transceiver 240) for use in performing positioning operations. The general-purpose processor 230, the DSP 231, and/or one or more specialized processors, and/or the memory 211 may provide or support a location engine for use in processing measurements to estimate a location of the UE 200.

The UE 200 may include the camera 218 for capturing still or moving imagery. The camera 218 may comprise, for example, an imaging sensor (e.g., a charge coupled device or a CMOS imager), a lens, analog-to-digital circuitry, frame buffers, etc. Additional processing, conditioning, encoding, and/or compression of signals representing captured images may be performed by the general-purpose processor 230 and/or the DSP 231. Also or alternatively, the video processor 233 may perform conditioning, encoding, compression, and/or manipulation of signals representing captured images. The video processor 233 may decode/decompress stored image data for presentation on a display device (not shown), e.g., of the user interface 216.

The position device (PD) 219 may be configured to determine a position of the UE 200, motion of the UE 200, and/or relative position of the UE 200, and/or time. For example, the PD 219 may communicate with, and/or include some or all of, the SPS receiver 217. The PD 219 may work in conjunction with the processor 210 and the memory 211 as appropriate to perform at least a portion of one or more positioning methods, although the description herein may refer only to the PD 219 being configured to perform, or performing, in accordance with the positioning method(s). The PD 219 may also or alternatively be configured to determine location of the UE 200 using terrestrial-based signals (e.g., at least some of the signals 248) for trilateration, for assistance with obtaining and using the SPS signals 260, or both. The PD 219 may be configured to use one or more other techniques (e.g., relying on the UE's self-reported location (e.g., part of the UE's position beacon)) for determining the location of the UE 200, and may use a combination of techniques (e.g., SPS and terrestrial positioning signals) to determine the location of the UE 200. The PD 219 may include one or more of the sensors 213 (e.g., gyroscope(s), accelerometer(s), magnetometer(s), etc.) that may sense orientation and/or motion of the UE 200 and provide indications thereof that the processor 210 (e.g., the processor 230 and/or the DSP 231) may be configured to use to determine motion (e.g., a velocity vector and/or an acceleration vector) of the UE 200. The PD 219 may be configured to provide indications of uncertainty and/or error in the determined position and/or motion. Functionality of the PD 219 may be provided in a variety of manners and/or configurations, e.g., by the general purpose/application processor 230, the transceiver 215, the SPS receiver 262, and/or another component of the UE 200, and may be provided by hardware, software, firmware, or various combinations thereof.

Figure 3:
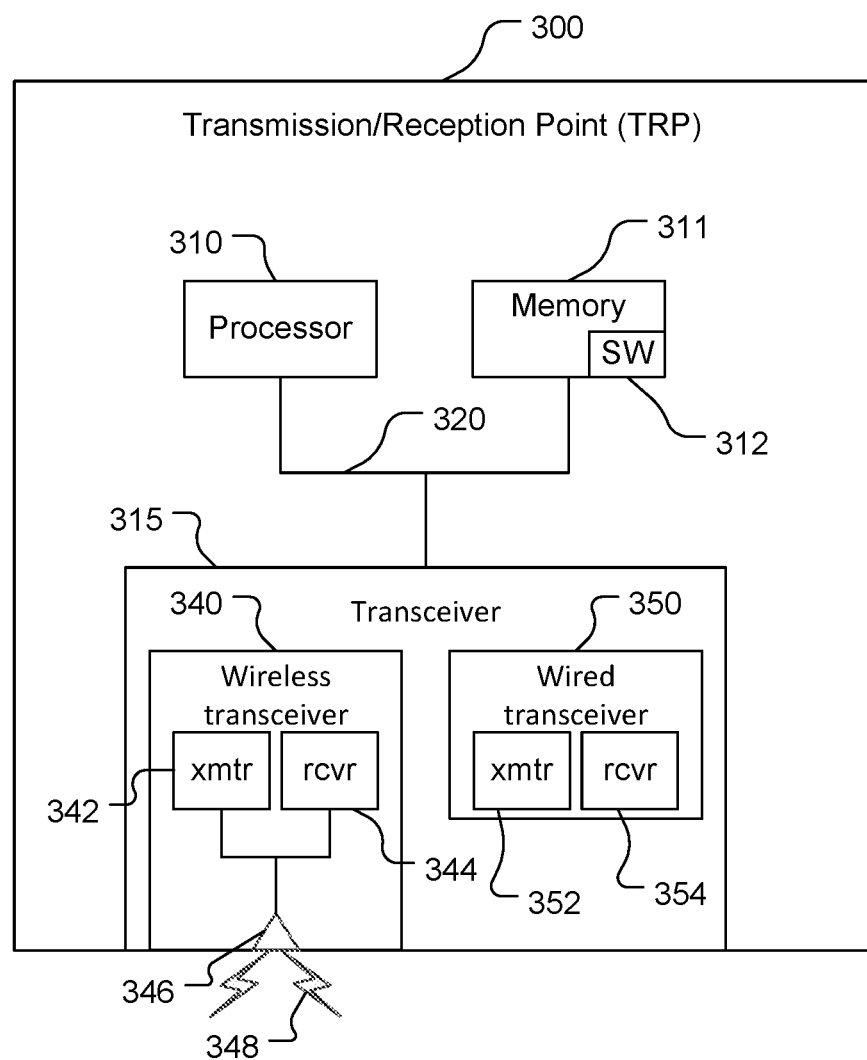
FIG. 3 is a block diagram of components of an example transmission/reception point shown in FIG. 1.

Referring also to FIG. 3, an example of a TRP 300 of the BSs 110a, 110b, 114 comprises a computing platform including a processor 310, memory 311 including software (SW) 312, and a transceiver 315. The processor 310, the memory 311, and the transceiver 315 may be communicatively coupled to each other by a bus 320 (which may be configured, e.g., for optical and/or electrical communication). One or more of the shown apparatus (e.g., a wireless interface) may be omitted from the TRP 300. The processor 310 may include one or more intelligent hardware devices, e.g., a central processing unit (CPU), a microcontroller, an application specific integrated circuit (ASIC), etc. The processor 310 may comprise multiple processors (e.g., including a general-purpose/application processor, a DSP, a modem processor, a video processor, and/or a sensor processor as shown in FIG. 2). The memory 311 is a non-transitory storage medium that may include random access memory (RAM), flash memory, disc memory, and/or read-only memory (ROM), etc. The memory 311 stores the software 312 which may be processor-readable, processor-executable software code containing instructions that are configured to, when executed, cause the processor 310 to perform various functions described herein. Alternatively, the software 312 may not be directly executable by the processor 310 but may be configured to cause the processor 310, e.g., when compiled and executed, to perform the functions. The description may refer only to the processor 310 performing a function, but this includes other implementations such as where the processor 310 executes software and/or firmware. The description may refer to the processor 310 performing a function as shorthand for one or more of the processors contained in the processor 310 performing the function. The description may refer to the TRP 300 performing a function as shorthand for one or more appropriate components of the TRP 300 (and thus of one of the BSs 110a, 110b, 114) performing the function. The processor 310 may include a memory with stored instructions in addition to and/or instead of the memory 311. Functionality of the processor 310 is discussed more fully below.

The transceiver 315 may include a wireless transceiver 340 and/or a wired transceiver 350 configured to communicate with other devices through wireless connections and wired connections, respectively. For example, the wireless transceiver 340 may include a transmitter 342 and receiver 344 coupled to one or more antennas 346 for transmitting (e.g., on one or more uplink channels and/or one or more downlink channels) and/or receiving (e.g., on one or more downlink channels and/or one or more uplink channels) wireless signals 348 and transducing signals from the wireless signals 348 to wired (e.g., electrical and/or optical) signals and from wired (e.g., electrical and/or optical) signals to the wireless signals 348. Thus, the transmitter 342 may include multiple transmitters that may be discrete components or combined/integrated components, and/or the receiver 344 may include multiple receivers that may be discrete components or combined/integrated components. The wireless transceiver 340 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. The wired transceiver 350 may include a wired transmitter 352 and a wired receiver 354 configured for wired communication, e.g., a network interface that may be utilized to communicate with the network 135 to send communications to, and receive communications from, the LMF 120, for example, and/or one or more other network entities. The transmitter 352 may include multiple transmitters that may be discrete components or combined/integrated components, and/or the receiver 354 may include multiple receivers that may be discrete components or combined/integrated components. The wired transceiver 350 may be configured, e.g., for optical communication and/or electrical communication.

The configuration of the TRP 300 shown in FIG. 3 is an example and not limiting of the invention, including the claims, and other configurations may be used. For example, the description herein discusses that the TRP 300 is configured to perform or performs several functions, but one or more of these functions may be performed by the LMF 120 and/or the UE 200 (i.e., the LMF 120 and/or the UE 200 may be configured to perform one or more of these functions).

Figure 4:
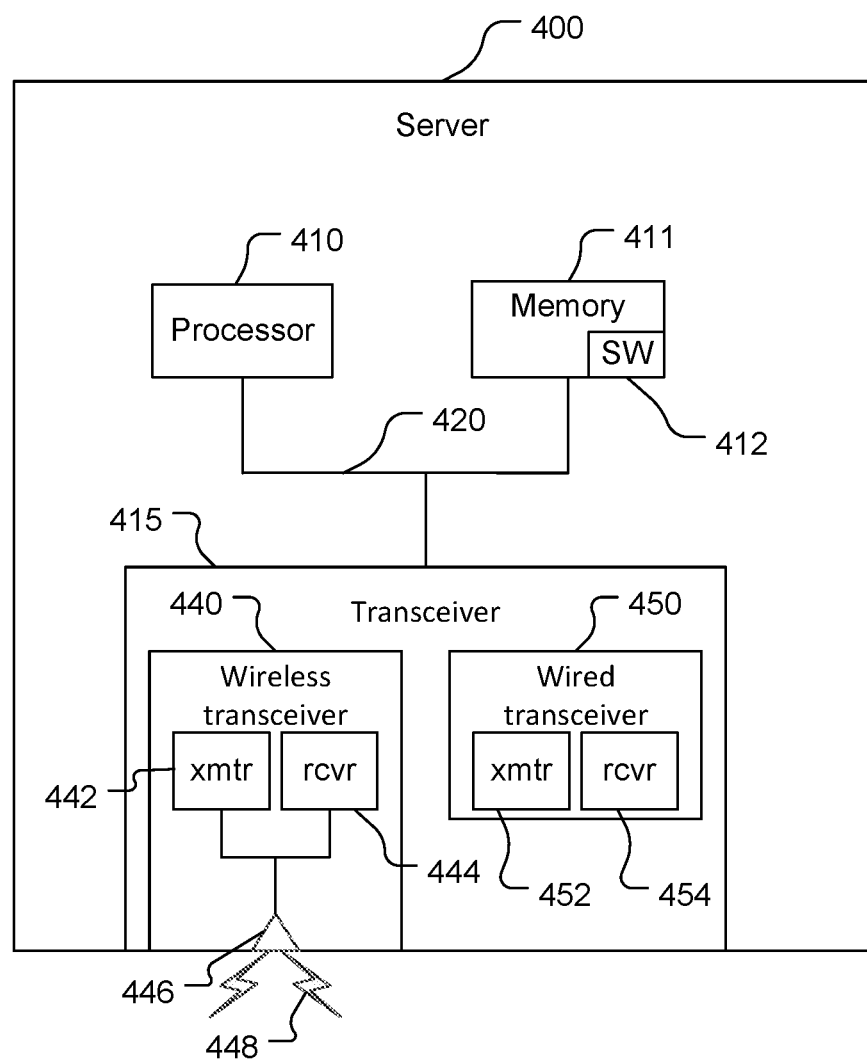
FIG. 4 is a block diagram of components of an example server shown in FIG. 1.

Referring also to FIG. 4, a server 400, which is an example of the LMF 120, comprises a computing platform including a processor 410, memory 411 including software (SW) 412, and a transceiver 415. The processor 410, the memory 411, and the transceiver 415 may be communicatively coupled to each other by a bus 420 (which may be configured, e.g., for optical and/or electrical communication). One or more of the shown apparatus (e.g., a wireless interface) may be omitted from the server 400. The processor 410 may include one or more intelligent hardware devices, e.g., a central processing unit (CPU), a microcontroller, an application specific integrated circuit (ASIC), etc. The processor 410 may comprise multiple processors (e.g., including a general-purpose/application processor, a DSP, a modem processor, a video processor, and/or a sensor processor as shown in FIG. 2). The memory 411 is a non-transitory storage medium that may include random access memory (RAM)), flash memory, disc memory, and/or read-only memory (ROM), etc. The memory 411 stores the software 412 which may be processor-readable, processor-executable software code containing instructions that are configured to, when executed, cause the processor 410 to perform various functions described herein. Alternatively, the software 412 may not be directly executable by the processor 410 but may be configured to cause the processor 410, e.g., when compiled and executed, to perform the functions. The description may refer only to the processor 410 performing a function, but this includes other implementations such as where the processor 410 executes software and/or firmware. The description may refer to the processor 410 performing a function as shorthand for one or more of the processors contained in the processor 410 performing the function. The description may refer to the server 400 performing a function as shorthand for one or more appropriate components of the server 400 performing the function. The processor 410 may include a memory with stored instructions in addition to and/or instead of the memory 411. Functionality of the processor 410 is discussed more fully below.

The transceiver 415 may include a wireless transceiver 440 and/or a wired transceiver 450 configured to communicate with other devices through wireless connections and wired connections, respectively. For example, the wireless transceiver 440 may include a transmitter 442 and receiver 444 coupled to one or more antennas 446 for transmitting (e.g., on one or more downlink channels) and/or receiving (e.g., on one or more uplink channels) wireless signals 448 and transducing signals from the wireless signals 448 to wired (e.g., electrical and/or optical) signals and from wired (e.g., electrical and/or optical) signals to the wireless signals 448. Thus, the transmitter 442 may include multiple transmitters that may be discrete components or combined/integrated components, and/or the receiver 444 may include multiple receivers that may be discrete components or combined/integrated components. The wireless transceiver 440 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. The wired transceiver 450 may include a wired transmitter 452 and a wired receiver 454 configured for wired communication, e.g., a network interface that may be utilized to communicate with the network 135 to send communications to, and receive communications from, the TRP 300, for example, and/or one or more other entities. The transmitter 452 may include multiple transmitters that may be discrete components or combined/integrated components, and/or the receiver 454 may include multiple receivers that may be discrete components or combined/integrated components. The wired transceiver 450 may be configured, e.g., for optical communication and/or electrical communication.

The configuration of the server 400 shown in FIG. 4 is an example and not limiting of the invention, including the claims, and other configurations may be used. For example, the wireless transceiver 440 may be omitted. Also or alternatively, the description herein discusses that the server 400 is configured to perform or performs several functions, but one or more of these functions may be performed by the TRP 300 and/or the UE 200 (i.e., the TRP 300 and/or the UE 200 may be configured to perform one or more of these functions).

Positioning Techniques

For terrestrial positioning of a UE in cellular networks, techniques such as Advanced Forward Link Trilateration (AFLT) and Observed Time Difference Of Arrival (OTDOA) often operate in "UE-assisted" mode in which measurements of reference signals (e.g., PRS, CRS, etc.) transmitted by base stations are taken by the UE and then provided to a location server. The location server then calculates the position of the UE based on the measurements and known locations of the base stations. Because these techniques use the location server to calculate the position of the UE, rather than the UE itself, these positioning techniques are not frequently used in applications such as car or cell-phone navigation, which instead typically rely on satellite-based positioning.

A UE may use a Satellite Positioning System (SPS) (a Global Navigation Satellite System (GNSS)) for high-accuracy positioning using precise point positioning (PPP) or real time kinematic (RTK) technology. These technologies use assistance data such as measurements from ground-based stations. LTE Release 15 allows the data to be encrypted so that only the UEs subscribed to the service can read the information. Such assistance data varies with time. Thus, a UE subscribed to the service may not easily "break encryption" for other UEs by passing on the data to other UEs that have not paid for the subscription. The passing on would need to be repeated every time the assistance data changes.

In UE-assisted positioning, the UE sends measurements (e.g., TDOA, Angle of Arrival (AoA), etc.) to the positioning server (e.g., LMF/eSMLC). The positioning server has the base station almanac (BSA) that contains multiple 'entries' or 'records', one record per cell, where each record contains geographical cell location but also may include other data. An identifier of the 'record' among the multiple 'records' in the BSA may be referenced. The BSA and the measurements from the UE may be used to compute the position of the UE.

In conventional UE-based positioning, a UE computes its own position, thus avoiding sending measurements to the network (e.g., location server), which in turn improves latency and scalability. The UE uses relevant BSA record information (e.g., locations of gNBs (more broadly base stations)) from the network. The BSA information may be encrypted. But since the BSA information varies much less often than, for example, the PPP or RTK assistance data described earlier, it may be easier to make the BSA information (compared to the PPP or RTK information) available to UEs that did not subscribe and pay for decryption keys. Transmissions of reference signals by the gNBs make BSA information potentially accessible to crowd-sourcing or war-driving, essentially enabling BSA information to be generated based on in-the-field and/or over-the-top observations.

Positioning techniques may be characterized and/or assessed based on one or more criteria such as position determination accuracy and/or latency. Latency is a time elapsed between an event that triggers determination of position-related data and the availability of that data at a positioning system interface, e.g., an interface of the LMF 120. At initialization of a positioning system, the latency for the availability of position-related data is called time to first fix (TTFF), and is larger than latencies after the TTFF. An inverse of a time elapsed between two consecutive position-related data availabilities is called an update rate, i.e., the rate at which position-related data are generated after the first fix. Latency may depend on processing capability, e.g., of the UE. For example, a UE may report a processing capability of the UE as a duration of DL PRS symbols in units of time (e.g., milliseconds) that the UE can process every T amount of time (e.g., T ms) assuming 272 PRB (Physical Resource Block) allocation. Other examples of capabilities that may affect latency are a number of TRPs from which the UE can process PRS, a number of PRS that the UE can process, and a bandwidth of the UE.

One or more of many different positioning techniques (also called positioning methods) may be used to determine position of an entity such as one of the UEs 105, 106. For example, known position-determination techniques include RTT, multi-RTT, OTDOA (also called TDOA and including UL-TDOA and DL-TDOA), Enhanced Cell Identification (E-CID), DL-AoD, UL-AoA, etc. RTT uses a time for a signal to travel from one entity to another and back to determine a range between the two entities. The range, plus a known location of a first one of the entities and an angle between the two entities (e.g., an azimuth angle) can be used to determine a location of the second of the entities. In multi-RTT (also called multi-cell RTT), multiple ranges from one entity (e.g., a UE) to other entities (e.g., TRPs) and known locations of the other entities may be used to determine the location of the one entity. In TDOA techniques, the difference in travel times between one entity and other entities may be used to determine relative ranges from the other entities and those, combined with known locations of the other entities may be used to determine the location of the one entity. Angles of arrival and/or departure may be used to help determine location of an entity. For example, an angle of arrival or an angle of departure of a signal combined with a range between devices (determined using signal, e.g., a travel time of the signal, a received power of the signal, etc.) and a known location of one of the devices may be used to determine a location of the other device. The angle of arrival or departure may be an azimuth angle relative to a reference direction such as true north. The angle of arrival or departure may be a zenith angle relative to directly upward from an entity (i.e., relative to radially outward from a center of Earth). E-CID uses the identity of a serving cell, the timing advance (i.e., the difference between receive and transmit times at the UE), estimated timing and power of detected neighbor cell signals, and possibly angle of arrival (e.g., of a signal at the UE from the base station or vice versa) to determine location of the UE. In TDOA, the difference in arrival times at a receiving device of signals from different sources along with known locations of the sources and known offset of transmission times from the sources are used to determine the location of the receiving device.

In a network-centric RTT estimation, the serving base station instructs the UE to scan for/receive RTT measurement signals (e.g., PRS) on serving cells of two or more neighboring base stations (and typically the serving base station, as at least three base stations are needed). The one of more base stations transmit RTT measurement signals on low reuse resources (e.g., resources used by the base station to transmit system information) allocated by the network (e.g., a location server such as the LMF 120). The UE records the arrival time (also referred to as a receive time, a reception time, a time of reception, or a time of arrival (ToA)) of each RTT measurement signal relative to the UE's current downlink timing (e.g., as derived by the UE from a DL signal received from its serving base station), and transmits a common or individual RTT response message (e.g., SRS (sounding reference signal) for positioning, i.e., UL-PRS) to the one or more base stations (e.g., when instructed by its serving base station) and may include the time difference $T_{Rx \to Tx}$ (i.e., UE $T_{RX-TX}$ or $UE_{RX-TX}$) between the ToA of the RTT measurement signal and the transmission time of the RTT response message in a payload of each RTT response message. The RTT response message would include a reference signal from which the base station can deduce the ToA of the RTT response. By comparing the difference $T_{Tx \to Rx}$ between the transmission time of the RTT measurement signal from the base station and the ToA of the RTT response at the base station to the UE-reported time difference $T_{Rx \to Tx}$, the base station can deduce the propagation time between the base station and the UE, from which the base station can determine the distance between the UE and the base station by assuming the speed of light during this propagation time.

A UE-centric RTT estimation is similar to the network-based method, except that the UE transmits uplink RTT measurement signal(s) (e.g., when instructed by a serving base station), which are received by multiple base stations in the neighborhood of the UE. Each involved base station responds with a downlink RTT response message, which may include the time difference between the ToA of the RTT measurement signal at the base station and the transmission time of the RTT response message from the base station in the RTT response message payload.

For both network-centric and UE-centric procedures, the side (network or UE) that performs the RTT calculation typically (though not always) transmits the first message(s) or signal(s) (e.g., RTT measurement signal(s)), while the other side responds with one or more RTT response message(s) or signal(s) that may include the difference between the ToA of the first message(s) or signal(s) and the transmission time of the RTT response message(s) or signal(s).

A multi-RTT technique may be used to determine position. For example, a first entity (e.g., a UE) may send out one or more signals (e.g., unicast, multicast, or broadcast from the base station) and multiple second entities (e.g., other TSPs such as base station(s) and/or UE(s)) may receive a signal from the first entity and respond to this received signal. The first entity receives the responses from the multiple second entities. The first entity (or another entity such as an LMF) may use the responses from the second entities to determine ranges to the second entities and may use the multiple ranges and known locations of the second entities to determine the location of the first entity by trilateration.

In some instances, additional information may be obtained in the form of an angle of arrival (AoA) or angle of departure (AoD) that defines a straight line direction (e.g., which may be in a horizontal plane or in three dimensions) or possibly a range of directions (e.g., for the UE from the locations of base stations). The intersection of two directions can provide another estimate of the location for the UE.

For positioning techniques using PRS (Positioning Reference Signal) signals (e.g., TDOA and RTT), PRS signals sent by multiple TRPs are measured and the arrival times of the signals, known transmission times, and known locations of the TRPs used to determine ranges from a UE to the TRPs. For example, an RSTD (Reference Signal Time Difference) may be determined for PRS signals received from multiple TRPs and used in a TDOA technique to determine position (location) of the UE. A positioning reference signal may be referred to as a PRS or a PRS signal. The PRS signals are typically sent using the same power and PRS signals with the same signal characteristics (e.g., same frequency shift) may interfere with each other such that a PRS signal from a more distant TRP may be overwhelmed by a PRS signal from a closer TRP such that the signal from the more distant TRP may not be detected. PRS muting may be used to help reduce interference by muting some PRS signals (reducing the power of the PRS signal, e.g., to zero and thus not transmitting the PRS signal). In this way, a weaker (at the UE) PRS signal may be more easily detected by the UE without a stronger PRS signal interfering with the weaker PRS signal.

Positioning reference signals (PRS) include downlink PRS (DL PRS) and uplink PRS (UL PRS) (which may be called SRS (Sounding Reference Signal) for positioning). PRS may comprise PRS resources or PRS resource sets of a frequency layer. A DL PRS positioning frequency layer (or simply a frequency layer) is a collection of DL PRS resource sets, from one or more TRPs, that have common parameters configured by higher-layer parameters DL-PRS-Positioning-FrequencyLayer, DL-PRS-ResourceSet, and DL-PRS-Resource. Each frequency layer has a DL PRS subcarrier spacing (SCS) for the DL PRS resource sets and the DL PRS resources in the frequency layer. Each frequency layer has a DL PRS cyclic prefix (CP) for the DL PRS resource sets and the DL PRS resources in the frequency layer. Also, a DL PRS Point A parameter defines a frequency of a reference resource block (and the lowest subcarrier of the resource block), with DL PRS resources belonging to the same DL PRS resource set having the same Point A and all DL PRS resource sets belonging to the same frequency layer having the same Point A. A frequency layer also has the same DL PRS bandwidth, the same start PRB (and center frequency), and the same value of comb-size.

A TRP may be configured, e.g., by instructions received from a server and/or by software in the TRP, to send DL PRS per a schedule. According to the schedule, the TRP may send the DL PRS intermittently, e.g., periodically at a consistent interval from an initial transmission. The TRP may be configured to send one or more PRS resource sets. A resource set is a collection of PRS resources across one TRP, with the resources having the same periodicity, a common muting pattern configuration (if any), and the same repetition factor across slots. Each of the PRS resource sets comprises multiple PRS resources, with each PRS resource comprising multiple Resource Elements (REs) that may be in multiple Resource Blocks (RBs) within N (one or more) consecutive symbol(s) within a slot. An RB is a collection of REs spanning a quantity of one or more consecutive symbols in the time domain and a quantity (12 for a 5G RB) of consecutive sub-carriers in the frequency domain. Each PRS resource is configured with an RE offset, slot offset, a symbol offset within a slot, and a number of consecutive symbols that the PRS resource may occupy within a slot. The RE offset defines the starting RE offset of the first symbol within a DL PRS resource in frequency. The relative RE offsets of the remaining symbols within a DL PRS resource are defined based on the initial offset. The slot offset is the starting slot of the DL PRS resource with respect to a corresponding resource set slot offset. The symbol offset determines the starting symbol of the DL PRS resource within the starting slot. Transmitted REs may repeat across slots, with each transmission being called a repetition such that there may be multiple repetitions in a PRS resource. The DL PRS resources in a DL PRS resource set are associated with the same TRP and each DL PRS resource has a DL PRS resource ID. A DL PRS resource ID in a DL PRS resource set is associated with a single beam transmitted from a single TRP (although a TRP may transmit one or more beams).

A PRS resource may also be defined by quasi-co-location and start PRB parameters. A quasi-co-location (QCL) parameter may define any quasi-co-location information of the DL PRS resource with other reference signals. The DL PRS may be configured to be QCL type D with a DL PRS or SS/PBCH (Synchronization Signal/Physical Broadcast Channel) Block from a serving cell or a non-serving cell. The DL PRS may be configured to be QCL type C with an SS/PBCH Block from a serving cell or a non-serving cell. The start PRB parameter defines the starting PRB index of the DL PRS resource with respect to reference Point A. The starting PRB index has a granularity of one PRB and may have a minimum value of 0 and a maximum value of 2176 PRBs.

A PRS resource set is a collection of PRS resources with the same periodicity, same muting pattern configuration (if any), and the same repetition factor across slots. Every time all repetitions of all PRS resources of the PRS resource set are configured to be transmitted is referred as an "instance". Therefore, an "instance" of a PRS resource set is a specified number of repetitions for each PRS resource and a specified number of PRS resources within the PRS resource set such that once the specified number of repetitions are transmitted for each of the specified number of PRS resources, the instance is complete. An instance may also be referred to as an "occasion." A DL PRS configuration including a DL PRS transmission schedule may be provided to a UE to facilitate (or even enable) the UE to measure the DL PRS.

Multiple frequency layers of PRS may be aggregated to provide an effective bandwidth that is larger than any of the bandwidths of the layers individually. Multiple frequency layers of component carriers (which may be consecutive and/or separate) and meeting criteria such as being quasi co-located (QCLed), and having the same antenna port, may be stitched to provide a larger effective PRS bandwidth (for DL PRS and UL PRS) resulting in increased time of arrival measurement accuracy. Being QCLed, the different frequency layers behave similarly, enabling stitching of the PRS to yield the larger effective bandwidth. The larger effective bandwidth, which may be referred to as the bandwidth of an aggregated PRS or the frequency bandwidth of an aggregated PRS, provides for better time-domain resolution (e.g., of TDOA). An aggregated PRS includes a collection of PRS resources and each PRS resource of an aggregated PRS may be called a PRS component, and each PRS component may be transmitted on different component carriers, bands, or frequency layers, or on different portions of the same band.

RTT positioning is an active positioning technique in that RTT uses positioning signals sent by TRPs to UEs and by UEs (that are participating in RTT positioning) to TRPs. The TRPs may send DL-PRS signals that are received by the UEs and the UEs may send SRS (Sounding Reference Signal) signals that are received by multiple TRPs. A sounding reference signal may be referred to as an SRS or an SRS signal. In 5G multi-RTT, coordinated positioning may be used with the UE sending a single UL-SRS for positioning that is received by multiple TRPs instead of sending a separate UL-SRS for positioning for each TRP. A TRP that participates in multi-RTT will typically search for UEs that are currently camped on that TRP (served UEs, with the TRP being a serving TRP) and also UEs that are camped on neighboring TRPs (neighbor UEs). Neighbor TRPs may be TRPs of a single BTS (e.g., gNB), or may be a TRP of one BTS and a TRP of a separate BTS. For RTT positioning, including multi-RTT positioning, the DL-PRS signal and the UL-SRS for positioning signal in a PRS/SRS for positioning signal pair used to determine RTT (and thus used to determine range between the UE and the TRP) may occur close in time to each other such that errors due to UE motion and/or UE clock drift and/or TRP clock drift are within acceptable limits. For example, signals in a PRS/SRS for positioning signal pair may be transmitted from the TRP and the UE, respectively, within about 10 ms of each other. With SRS for positioning being sent by UEs, and with PRS and SRS for positioning being conveyed close in time to each other, it has been found that radio-frequency (RF) signal congestion may result (which may cause excessive noise, etc.) especially if many UEs attempt positioning concurrently and/or that computational congestion may result at the TRPs that are trying to measure many UEs concurrently.

RTT positioning may be UE-based or UE-assisted. In UE-based RTT, the UE 200 determines the RTT and corresponding range to each of the TRPs 300 and the position of the UE 200 based on the ranges to the TRPs 300 and known locations of the TRPs 300. In UE-assisted RTT, the UE 200 measures positioning signals and provides measurement information to the TRP 300, and the TRP 300 determines the RTT and range. The TRP 300 provides ranges to a location server, e.g., the server 400, and the server determines the location of the UE 200, e.g., based on ranges to different TRPs 300. The RTT and/or range may be determined by the TRP 300 that received the signal(s) from the UE 200, by this TRP 300 in combination with one or more other devices, e.g., one or more other TRPs 300 and/or the server 400, or by one or more devices other than the TRP 300 that received the signal(s) from the UE 200.

Various positioning techniques are supported in 5G NR. The NR native positioning methods supported in 5G NR include DL-only positioning methods, UL-only positioning methods, and DL+UL positioning methods. Downlink-based positioning methods include DL-TDOA and DL-AoD. Uplink-based positioning methods include UL-TDOA and UL-AoA. Combined DL+UL-based positioning methods include RTT with one base station and RTT with multiple base stations (multi-RTT).

A position estimate (e.g., for a UE) may be referred to by other names, such as a location estimate, location, position, position fix, fix, or the like. A position estimate may be geodetic and comprise coordinates (e.g., latitude, longitude, and possibly altitude) or may be civic and comprise a street address, postal address, or some other verbal description of a location. A position estimate may further be defined relative to some other known location or defined in absolute terms (e.g., using latitude, longitude, and possibly altitude). A position estimate may include an expected error or uncertainty (e.g., by including an area or volume within which the location is expected to be included with some specified or default level of confidence).

Downlink PRS Processing

Due to potential complexity (especially relative to LTE) and volume of positioning signals, limitations may be placed on positioning signals to limit PRS processing (including data buffering). For example, for NR, each TRP may have multiple beams and thus multiple PRS resources. For example, each TRP may configure up to 64 beams and thus up to 64 PRS resources for FR2 (Frequency Range 2 that is a mm-wave band from 24.25 GHz to 52.6 GHz) and up to 8 PRS resources for FR1 (Frequency Range 1 from 410 MHz to 7.125 GHz). A Fast Fourier Transform (FFT) size used for NR may be 4K, which is twice the FFT size used for LTE. Further, there may be up to 12 symbols per slot with a repetition of 32 slots (with each slot being possibly eight times smaller than an LTE subframe). Thus, the NR PRS may be as much as 1,000 times more complex that LTE. Consequently, one or more limitations may be placed on various UE position-processing capabilities to constrain the complexity and facilitate PRS processing (e.g., reduce processing including reducing data buffering) for positioning (e.g., processing of positioning signals in accordance with one or more positioning methods for determining location of the UE to determine position information (e.g., range (e.g., pseudorange), one or more PRS measurements, UE location, etc.)). For example, position-processing capabilities of a UE that may be designated include a maximum number of frequency layers (e.g., one or four), a maximum number of TRPs per frequency layer, a maximum number of PRS resource sets per TRP per frequency layer, a maximum number of PRS resources per PRS resource set, a maximum number of DL PRS resources per UE, a maximum number of TRPs for all frequency layers per UE, a maximum number of PRS resources per frequency layer, etc.

To facilitate PRS processing, e.g., to free up potential processing power for processing PRS, measurement gaps may be scheduled for a UE (although possibly only one measurement gap may be scheduled at a time). For example, a UE may request a measurement gap configuration so that the UE can measure DL PRS outside of an active DL BWP (BandWidth Part). A server, e.g., an LMF, may schedule one or more measurement gaps, e.g., in response to a request from the UE or independent of (e.g., in the absence of) any such request. The measurement gap, which may be requested by the UE, is a time during which the UE will not receive data or control information and thus not need to perform data or control processing. The UE may thus dedicate processing power that would be used for data and/or control processing to positioning processing of PRS to determine position information. The position information may be a position (location) of the UE or other information (e.g., one or more ranges and/or one or more PRS measurements (e.g., RSTD, RSRP, Rx-Tx)) that may be used for determining the position of the UE. With a measurement gap, the UE may measure the DL PRS outside of the active DL BWP or with a numerology different from that of the active DL BWP, with the numerology being the configuration of waveform parameters subcarrier spacing and cyclic prefix size. Without a measurement gap, the UE will measure DL PRS within an active DL BWP with the same numerology as the active BWP. Further, the UE will not be expected to process DL PRS in the same OFDM (Orthogonal Frequency Division Multiplexing) symbol where other DL signals and channels are transmitted to the UE, or to process DL PRS on any symbol indicated as uplink by the serving TRP.

Positioning Methods Per Positioning Frequency Band

Figure 5:
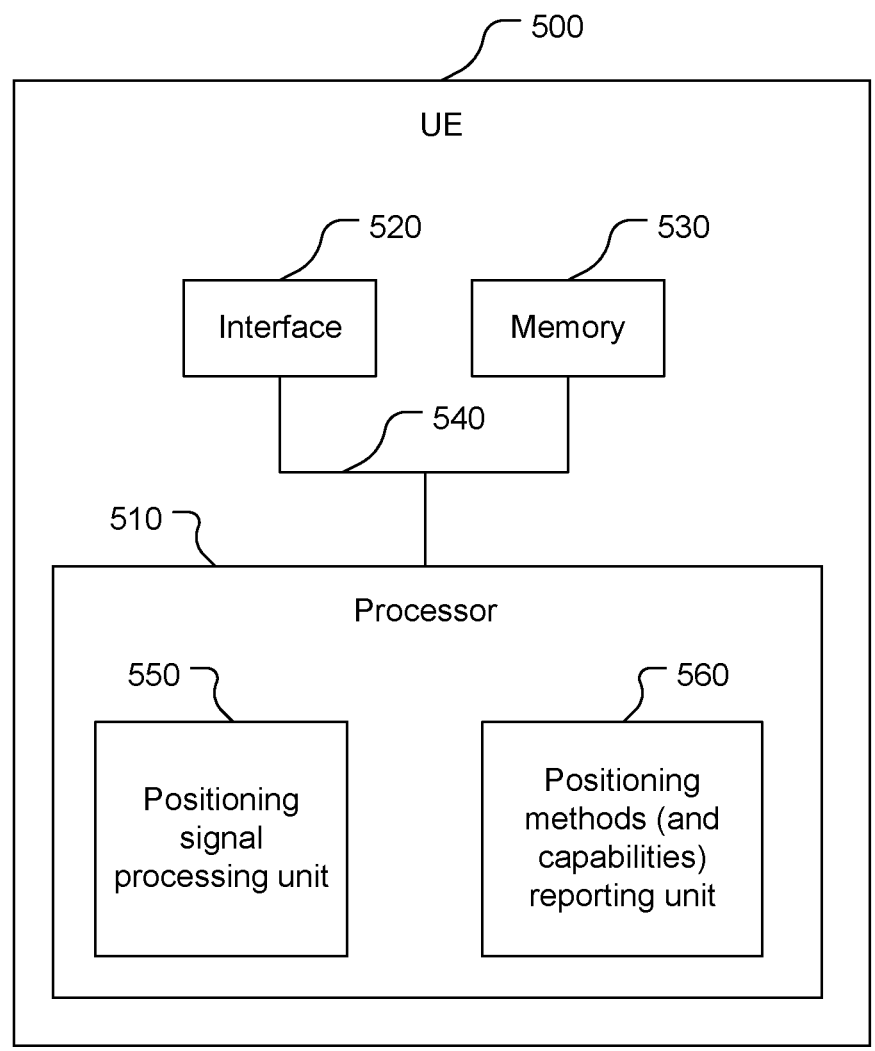
FIG. 5 is a block diagram of an example user equipment.

Referring to FIG. 5, with further reference to FIGS. 1-4, a UE 500 includes a processor 510, an interface 520, and a memory 530 communicatively coupled to each other by a bus 540. The UE 500 may include the components shown in FIG. 5, and may include one or more other components such as any of those shown in FIG. 2 such that the UE 200 may be an example of the UE 500. For example, the processor 510 may include one or more of the components of the processor 210. The interface 520 may include one or more of the components of the transceiver 215, e.g., the wireless transmitter 242 and the antenna 246, or the wireless receiver 244 and the antenna 246, or the wireless transmitter 242, the wireless receiver 244, and the antenna 246. Also or alternatively, the interface 520 may include the wired transmitter 252 and/or the wired receiver 254. The memory 530 may be configured similarly to the memory 211, e.g., including software with processor-readable instructions configured to cause the processor 510 to perform functions.

The description herein may refer only to the processor 510 performing a function, but this includes other implementations such as where the processor 510 executes software (stored in the memory 530) and/or firmware. The description herein may refer to the UE 500 performing a function as shorthand for one or more appropriate components (e.g., the processor 510 and the memory 530) of the UE 500 performing the function. The processor 550 (possibly in conjunction with the memory 530) includes a positioning signal processing unit 550 and a positioning methods (and capabilities) reporting unit 560. The positioning signal processing unit 550 is configured to process positioning signals in accordance with supported positioning methods to produce position information (e.g., position, range(s), PRS measurement(s), etc.). The positioning methods (and capabilities) reporting unit 560 is configured to obtain (e.g., produce/generate and/or select) supported positioning methods and, optionally, corresponding position-processing capabilities and send indications of these via the interface 520 to appropriate destinations such as a network entity such as the TRP 300 or the server 400. The description may refer to the processor 510 or the UE 500 performing a function that is performed by the unit 550 or the unit 560.

The UE 500 may be configured to support multiple positioning methods, including supporting simultaneous processing of multiple positioning methods. Simultaneous processing of multiple positioning methods, e.g., simultaneous processing of signals for two or more of AoD, AoA, TDOA, or multi-RTT methods, involves processing of one or more signals using two or more positioning methods in parallel (the respective overall processing of the signal(s) using the two methods overlapping in time regardless of whether respective operations of the different methods are ever performed at the same time). For example, the processor 510 (and the memory 530 as appropriate) may process positioning signals (e.g., PRS) in accordance with two or more positioning methods (such as the positioning methods discussed herein) overlapping in time to determine position information. By processing the positioning signals in accordance with a positioning method, the processor 510 may or may not determine the position of the UE 500, e.g., determining information that, while not the position itself, may be used to determine the position. For example, the processor 510 (which may include the PD 219) may process one or more PRS to determine one or more ranges to one or more sources of the positioning signal(s) and/or to determine one or more PRS measurements. The UE 500 may support simultaneous processing of multiple positioning methods in that, for example, the UE 500 may have multiple positioning methods triggered in a single positioning session, the UE 500 may perform (at least respective portions of) multiple positioning methods at the same time (e.g., during the same window of time with operations of the different methods performed at the same time (e.g., in parallel) and/or at different times (e.g., interleaved)), and/or the UE 500 may report results of (at least respective portions of) the multiple positioning methods jointly (e.g., at the same time, in a single message). For example, the UE 500 could report one or more RSTD measurements for the TDOA positioning method and/or one or more RSRP (Reference Signal Received Power) measurements for the AoD positioning method.

Figure 6:
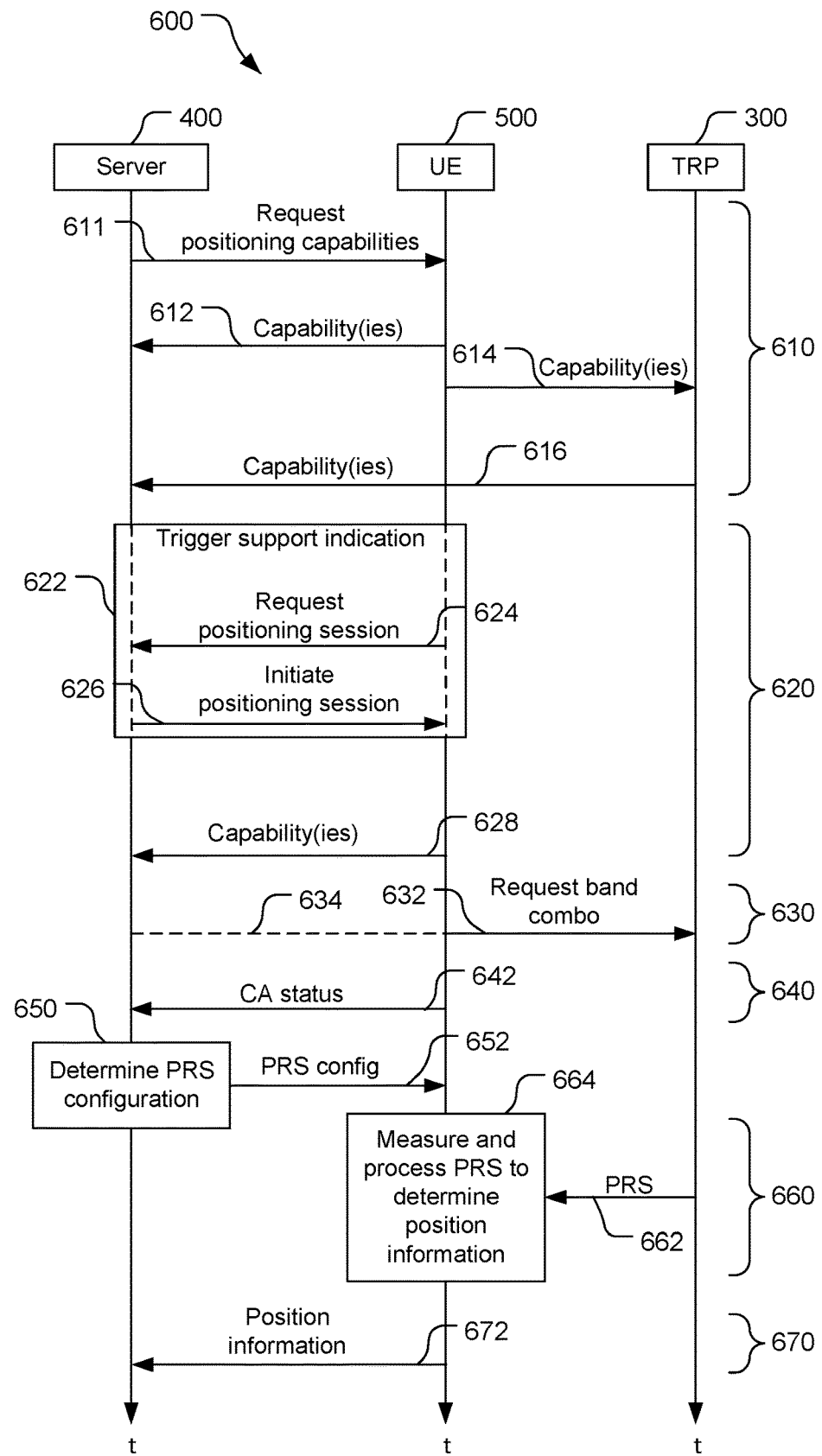
FIG. 6 is a signaling and process flow of reporting positioning capabilities and determining and reporting position information.

Referring to FIG. 6, with further reference to FIGS. 1-5, a signaling and process flow of reporting positioning capabilities and determining and reporting position information includes the stages shown. The flow 600 is an example, and not limiting of the disclosure. The flow 600 may be altered, e.g., by having stages added, removed, rearranged, repeated, combined, performed concurrently, and/or having single stages split into multiple stages, with examples of such alterations discussed further below.

At stage 610, positioning capabilities are requested from and provided by the UE 500. The server 400 may send a positioning capabilities request 611 to the UE 500 for positioning capabilities of the UE 500. The request 611 may be sent using LPP (LTE Positioning Protocol) to request the UE 500 provide indications of what positioning methods the UE 500 supports and possibly what position-processing capabilities the UE 500 has for the positioning methods and/or combinations of positioning methods.

The UE 500 responds to the positioning capabilities request 611 by sending a capability message 612 to the server 400 indicating one or more positioning methods supported by the UE 500 for one or more corresponding frequency bands and, possibly, position-processing capabilities corresponding to at least some of the indicated positioning methods. The capability message 612 may include other information (e.g., regarding other capabilities) as well. Also or alternatively, the UE 500 may send a capability message 614 to the TRP 300 and the TRP 300 may send a capability message 616 to the server 400. Thus, the flow 600 may include sending the capability message 612 and/or may include sending the capability messages 614, 616.

The capability messages 612, 614, 616 may have a variety of formats and/or content, and the capability messages 612, 614, 616 may not all have the same format or content. Referring also to FIG. 7, a capability message 700 is an example of the capability messages 612, 614, 616 and includes a frequency-band field 710, a positioning-method field 720, and may also include a position-processing-capabilities field 730. The frequency-band field 710 includes one or more frequency-band indications of one or more frequency bands for each of which the UE 500 supports one or more positioning methods, i.e., for which the UE 500 may perform one or more operations of the respective positioning method(s) and provide resulting position information. Here, the capability message 700 includes frequency-band indications 712, 714 indicating that the UE 500 supports one or more positioning methods for each of Band 1 and Band 2. These bands are positioning signal bands separate from (though possibly overlapping with) communication frequency bands used for data and control information. For example, Band 1 may be FR1 and Band 2 may be FR2.

The positioning-method field 720 includes one or more indications of positioning methods supported by the UE 500 to process positioning signals to determine position information. In this example, the positioning-method field 720 is used to indicate whether the UE 500 supports one or more of four possible positioning methods, namely the DL-TDOA positioning method, the AoD positioning method, the AoA positioning method, or the multi-RTT method. This is an example, and the positioning-method field 720 could be used to indicate whether the UE 500 supports more or fewer positioning methods, and/or a different set of positioning methods (i.e., with one or more of the listed positioning methods omitted and/or with one or more other positioning methods included). Here, with the positioning-method field 720 indicative of support for any of four positioning methods, the positioning-method field 720 includes positioning-method indications 721, 722, 723, 724, 725 that are four-bit strings. Each bit indicates whether a corresponding positioning method is supported, here with a value of 0 indicating not supported and a value of 1 indicating supported. In this example, the four bits correspond to the four methods of DL-TDOA, AoD, AoA, and multi-RTT, respectively. Each of the four-bits strings respectively indicate one or more of the four possible positioning methods that the UE 500 is configured to support for the respective frequency band indicated by the respective frequency-band indications 712, 714. Thus, the frequency-band indications 712, 714 indicate respective frequency bands to which the corresponding positioning-method indications 721-725 are applicable.

Each of the positioning-method indications in the positioning-method field 720 may indicate an individual positioning method that the UE 500 is configured to support or a combination of positioning methods that the UE 500 is configured to support simultaneously. A capability message may include an explicit indication that multiple positioning methods are supported for simultaneous processing. Also or alternatively, the indication that multiple positioning methods are supported may be an implicit indication that the UE supports simultaneous processing of the indicated positioning methods. In the example shown in FIG. 7, for Band 1, the positioning-method indication 721 of 0100 indicates that the UE 500 is configured to support the AoD positioning method alone, the positioning-method indication 722 of 1000 indicates that the UE 500 is configured to support the DL-TDOA positioning method alone, and the positioning-method indication 723 of 1100 indicates that the UE 500 is configured to support the DL-TDOA positioning method and the AoD positioning method simultaneously. For Band 2, the positioning-method indication 724 of 0001 indicates that the UE 500 is configured to support the multi-RTT positioning method alone, and the positioning-method indication 725 of 0101 indicates that the UE 500 is configured to support the AoD positioning method and the multi-RTT positioning method simultaneously. Thus, the capability message 700 may indicate combinations of the positioning methods (in this example, the same combination of positioning methods for Band 1 and Band 2) that the UE 500 (e.g., the processor 210 (that may implement the PD 219)) is configured to support to process positioning signals simultaneously to determine position information.

The position-processing-capabilities field 730 includes one or more indications of position-processing capabilities for a respective positioning method or positioning method combination supported by the UE 500 as indicated by a respective one of the positioning-method indications. In this example, the position-processing capabilities field 730 corresponds to positioning-method capabilities of a maximum number of frequency layers (X1), a maximum number of TRPs per frequency layer (X2), a maximum number of PRS resource sets per TRP per frequency layer (X3), a maximum number of PRS resources per PRS resource set (X4), a maximum number of DL PRS resources per UE (X5), a maximum number of TRPs for all frequency layers per UE (X6), and a maximum number of PRS resources per frequency layer (X7). The capability message 700 includes position-processing-capabilities indications 731, 732, 733, 734, 735, 736 that each includes values for the positioning-method capabilities X1-X7 corresponding to a respective one of the positioning-method indications 721-725. As shown, more than one position-processing-capabilities indication may correspond to the same positioning-method indication, here with the position-processing-capabilities indications 735, 736 both corresponding to the positioning-method indication 725. One or more of the values, or even all of the values, of the positioning-method capabilities X1-X7 may be the same in multiple position-processing-capabilities indications.

A position-processing-capabilities indication corresponding to a combination of supported positioning methods may indicate the capabilities for the combination of positioning methods, or the capabilities for each of the positioning methods individually. For example, the values $X1_3$-$X7_3$ may be the capabilities for the combination of the DL-TDOA method and the AoD method or may be the capabilities for each of the DL-TDOA method or the AoD method individually. If the values of a position-processing-capabilities indication correspond to the combination of positioning methods, the capabilities may be allocated to the different positioning methods by a default allocation, e.g., equally (or close to equally), known by both the UE 500 and the server 400. Whether the values of the position-processing-capabilities indication correspond to the combination of positioning methods or the positioning methods individually may be known by (e.g., programmed into) the UE 500 and the server 400 and/or may be indicated by the position-processing capabilities indication.

Multiple position-processing-capabilities indications corresponding to a single combination of supported positioning methods may indicate the capabilities for each of the positioning methods individually. For example, the position-processing-capabilities indications 735, 736 both correspond to the positioning-method indication 725 that indicates that the UE 500 is configured to support the AoD method and the multi-RTT method simultaneously. The values $X1_5$-$X7_5$ of the position-processing-capabilities indication 735 may be values of the capabilities that the UE 500 will provide for the DL-TDOA positioning method, and the values $X1_6$-$X7_6$ of the position-processing-capabilities indication 736 may be the capabilities that the UE 500 will provide for the AoD method, with the DL-TDOA method and the AoD method implemented simultaneously.

The values of the position-processing-capabilities indications in the position-processing-capabilities field 730 may be different if there is a measurement gap (or gaps) scheduled. The values of one or more of the positioning-method capabilities X1-X7 may provide for more processing capability (possibly including more buffering capability) for a time of a measurement gap compared to a time with no measurement gap. Thus, a position-processing-capabilities indication may include values for the positioning-method capabilities X1-X7 for when there is a measurement gap and for where there is no measurement gap.

Positioning Methods In View of Frequency-Band Combinations

Positioning signal (e.g., PRS, SL-SRS for positioning, etc.) processing may be affected by a currently-used communication frequency-band combination. For example, processing power of the processor 510 may be affected differently depending upon which communication frequency band is currently in use. Thus, the available processing capacity of the processor 510 for processing positioning signals may be affected based on the communication frequency band that is currently in use. Consequently, the UE 500 may support different positioning methods and/or different combinations of positioning methods based on the current communication frequency band and/or may have different position-processing capabilities based on the current communication frequency band. The description herein may refer to PRS, but the description may be applicable to other forms of positioning signals (e.g., SL-SRS for positioning, etc.).

At stage 620 of the flow 600, reporting of one or more supported frequency band combinations and one or more corresponding positioning methods is triggered and performed. For example, at sub-stage 622, a trigger for the UE 500 to report supported positioning methods and associated position-processing capabilities for communication frequency-band combinations may be the UE 500 sending a request 624 for a positioning session to the server 400. As another example, a trigger for the UE 500 to report supported positioning methods and associated position-processing capabilities for communication frequency-band combinations may be the server 400 initiating a positioning session with the UE 500 by sending an initiate positioning session message 626 to the UE 500. Another trigger may be the expiration of a timer (e.g., implemented by the processor 510). Still other triggers are possible, e.g., for on-demand triggering of a support indication or intermittent (e.g., periodic) triggering of a support indication.

In response to a trigger, the UE 500 sends a capability message 628 to the server 400 indicating one or more supported frequency band combinations and one or more corresponding supported positioning methods. The capability message 628 is sent using LPP signaling and may have a variety of formats and/or content. Referring also to FIG. 8, a capability message 800 is an example of the capability message 628 and indicates positioning methods supported by the UE 500, corresponding communication frequency-band combinations, and possibly position-processing capabilities corresponding to the indicated positioning methods and frequency-band combinations. The capability message 800 includes a frequency-band-combination field 810, a positioning-method field 820, and may include a position-processing-capabilities field 830. As with the capability message 700 (although not shown in FIG. 6), the capability message 800 may be sent from the UE 500 to the TRP 300 (using RRC (Radio Resource Control) signaling) and then from the TRP 300 to the server 400 (using NRPPa (New Radio Positioning Protocol A) signaling).

The frequency-band-combination field 810 includes one or more frequency-band-combination indications of frequency-band combinations for each of which the UE 500 supports one or more positioning methods, i.e., for which the UE 500 may perform one or more operations of the respective positioning method(s) and provide resulting position information. For example, the frequency-band-combination field 810 may include indications of frequency-band combinations contained in a BandCombinationList defined by 3GPP (3rd Generation Partnership Project). Here, the capability message 800 includes frequency-band-combination indications 812, 814, 816 indicating that the UE 500 supports one or more positioning methods for each of three frequency band combinations, namely a combination of frequency band 1 (FB1) and frequency band 2 (FB2), a combination of FB1 and frequency band 3 (FB3), and a combination of frequency band 4 (FB4) and frequency band 5 (FB5) and frequency band 6 (FB6). The labels FB1-FB6 are generic labels and do not imply any relationship of the bands (e.g., FB1 is not necessarily contiguous or even near FB2, and FB2 is not necessarily a higher frequency band than FB1). These band combinations may be intra-band contiguous (within the same larger band, e.g., FR1, and contiguous in frequency), intra-band non-contiguous (within the same larger band but separated by some amount of frequencies), or inter-band (within one or more bands in one larger band and one or more other bands in another larger band, e.g., FR2, with the two larger bands likely separated by some amount of frequencies). Band combinations may be of two or more bands.

The positioning-method field 820 includes one or more indications of positioning methods supported by the UE 500 to process positioning signals to determine position information. The positioning-method field 820 is similar to the positioning-method field 720, but with entries corresponding to respective frequency-band combinations of the frequency-band-combination field 810. The positioning methods indicated in the positioning-method field 820 may be more limited than the positioning methods indicated in the positioning-method field 720 of the capability message 700 due, for example, to processing power and/or other UE resources that may be used, and/or designated (reserved) for use, in processing communication information (data and/or control information) in the frequency-band combinations. In this example, the positioning-method field 820 is used to indicate whether the UE 500 supports one or more of the DL-TDOA positioning method, the AoD positioning method, the AoA positioning method, or the multi-RTT method. This is an example, and the positioning-method field 820 could be used to indicate whether the UE 500 supports more or fewer positioning methods, and/or a different set of positioning methods (i.e., with one or more of the listed positioning methods omitted and/or with one or more other positioning methods included). Here, with the positioning-method field 820 indicative of support for any of four positioning methods, the positioning-method field 820 includes positioning-method indications 821, 822, 823, 824, 825, 826, 827 that are four-bit strings respectively indicating one or more of the four indicated positioning methods that the UE 500 is configured to support for the respective frequency-band combinations indicated by the respective frequency-band-combination indications 812, 814, 816. Thus, the frequency-band combination indications 812, 814, 816 indicate respective frequency bands to which the corresponding positioning-method indications 821-827 are applicable.

Each of the positioning-method indications in the positioning-method field 820 may indicate an individual positioning method that the UE 500 is configured to support or a combination of positioning methods that the UE 500 is configured to support simultaneously. In the example shown in FIG. 8, for the band combination of FB1-FB2, the positioning-method indication 821 indicates that the UE 500 is configured to support the AoD positioning method alone, the positioning-method indication 822 indicates that the UE 500 is configured to support the DL-TDOA positioning method alone, and the positioning-method indication 823 indicates that the UE 500 is configured to support the DL-TDOA positioning method and the multi-RTT positioning method simultaneously. For the band combination of FB1-FB3, the positioning-method indication 824 indicates that the UE 500 is configured to support the multi-RTT positioning method alone, and the positioning-method indication 825 indicates that the UE 500 is configured to support the AoD positioning method and the multi-RTT positioning method simultaneously. For the band combination of FB4-FB5-FB6, the positioning-method indication 826 indicates that the UE 500 is configured to support the DL-TDOA positioning method alone, and the positioning-method indication 827 indicates that the UE 500 is configured to support the multi-RTT positioning method alone. Thus, the capability message 800 may indicate combinations of the positioning methods that the UE 500 is configured to support to process positioning signals simultaneously to determine position information.

The position-processing-capabilities field 830 includes one or more indications of position-processing capabilities for a respective positioning method or positioning method combination supported by the UE 500 as indicated by a respective one of the positioning-method indications. In this example, the positioning-processing capabilities field 830 corresponds to positioning-method capabilities X1-X7 discussed above. The capability message 800 includes position-processing-capabilities indications 831, 832, 833, 834, 835, 836 that each includes values for the positioning-method capabilities X1-X7 corresponding to a respective one of the positioning-method indications 821-827. As shown, more than one position-processing-capabilities indication may correspond to the same positioning-method indication, here with the position-processing-capabilities indications 833, 834 both corresponding to the positioning-method indication 825. One or more of the values, or even all of the values, of the positioning-method capabilities X1-X7 may be the same in multiple position-processing-capabilities indications. The values of one or more of the positioning-method capabilities X1-X7 in the capability message 800 may be more restrictive, e.g., provide one or more lower maxima, than the values of the positioning-method capabilities X1-X7 in the capability message 700, e.g., due to the reduced capacity for positioning processing as discussed herein when a communication frequency-band combination is in use. The UE 500 may be limited to the capabilities provided by one of the position-processing-capabilities indications 831-836 (or other such indication) only when the respective frequency-band combination is in use, and not merely supported by the UE 500 for use.

A position-processing-capabilities indication corresponding to a combination of supported positioning methods may indicate the capabilities for the combination of positioning methods, or the capabilities for each of the positioning methods individually. For example, the values $X1_7$-$X7_7$ may be the capabilities for the combination of the DL-TDOA method and the multi-RTT method (as indicated by the positioning-method indication 823) or may be the capabilities for each of the DL-TDOA method or the multi-RTT method individually. If the values of a position-processing-capabilities indication correspond to the combination of positioning methods, the capabilities may be allocated to the different positioning methods by a default allocation, e.g., equally (or close to equally), known by both the UE 500 and the server 400. Whether the values of the position-processing-capabilities indication correspond to the combination of positioning methods or the positioning methods individually may be known by (e.g., programmed into) the UE 500 and the server 400 and/or may be indicated by the position-processing capabilities indication.

Multiple position-processing-capabilities indications corresponding to a single combination of supported positioning methods may indicate the capabilities for each of the positioning methods individually. For example, the position-processing-capabilities indications 833, 834 both correspond to the positioning-method indication 825 that indicates that the UE 500 is configured to support the AoD method and the multi-RTT method simultaneously. The values $X1_9$-$X7_9$ of the position-processing-capabilities indication 833 may be values of the capabilities that the UE 500 will provide for the DL-TDOA positioning method, and the values $X1_{10}$-$X7_{10}$ of the position-processing-capabilities indication 834 may be the capabilities that the UE 500 will provide for the AoD method, with the DL-TDOA method and the AoD method implemented simultaneously.

The values of the position-processing-capabilities indications in the position-processing-capabilities field 830 may be different if there is a measurement gap (or gaps) scheduled. The values of one or more of the positioning-method capabilities X1-X7 may provide for more processing capability (possibly including more buffering capability) for a time of a measurement gap compared to a time with no measurement gap. Thus, a position-processing-capabilities indication may include values for the positioning-method capabilities X1-X7 for when there is a measurement gap and for where there is no measurement gap.

Referring again to FIG. 6, with further reference to FIGS. 1-5, 7, and 8, at stage 630, the UE 500 may send a request 632 that the TRP 300 configure the UE 500 to a specific communication frequency-band combination. Also or alternatively (as indicated by a dashed line 634), the server 400 may request that the TRP 300 configure the UE 500 to a specific communication frequency-band combination. For example, the request for the specific communication frequency-band combination may be sent so that the UE 500 may accept and process more positioning signals, and/or may support more positioning methods, and/or may support a different positioning method, and/or may support a desired combination of positioning methods, and/or may provide one or more better position processing capabilities (e.g., relative to present capability(ies)). The frequency-band combination may be selected and requested in order to improve utilization of the potential processing capability of the UE 500 (e.g., to change the current frequency-band combination to increase the processing efforts of the UE 500 that can be used for positioning).

At stage 640, the UE 500 sends a current carrier aggregation (CA) status message 642 to the server 400. The current CA status message 642 indicates the frequency-band combination presently in use by the UE 500 to communicate with the TRP 300. Alternatively, the TRP 300 may provide the current CA status for the UE 500 to the server 400. The current CA status may be provided by the UE 500 in stage 620 along with the capability message 628. The current CA status message 642 may be sent repeatedly, e.g., periodically or otherwise (e.g., triggered on demand) to the server 400 as the current CA status may change. An on-demand trigger to send the current CA status message 642 may be, for example, a CA status change, the opening of a positioning session (e.g., in response to the message 626), the request 624 for a positioning session, etc.

At stage 650, the server 400 may determine a PRS configuration for the UE 500 and send the PRS configuration 652 to the UE 500. The server 400 may use information (e.g., supported positioning methods and/or position-processing capabilities) from the capability message 700 and/or the capability message 800 (and in the case of using the capability message 800, the current frequency-band combination as reported at stage 640) to determine the PRS configuration (e.g., the type of PRS and/or the quantity of PRS) to be used. The PRS configuration may be determined to improve utilization of the potential processing capability of the UE 500 (e.g., to configure PRS to increase the processing efforts of the UE 500 that can be used for positioning). Also or alternatively, the PRS configuration may be selected to reduce waste, e.g., processing power of the TRP 300 to send PRS to the UE 500 that the UE 500 will not process (at least fully) due to insufficient capacity. The PRS configuration 652 may be sent directly from the server 400 to the UE 500 using LPP signaling and/or from the server 400 to the TRP 300 using NRPPa signaling and from the TRP 300 to the UE 500 using LPP signaling.

At stage 660, the TRP 300 may provide PRS 662 to the UE 500 and the UE 500 may, at sub-stage 664, measure and simultaneously process the PRS to determine position information. For example, the UE 500 may simultaneously process the PRS 662 received at stage 660 in accordance with positioning capabilities indicated in the capability message 700 or the capability message 800 as appropriate, including in accordance with whether there is presently a measurement gap. The UE 500 may determine position information such as one or more PRS measurements, one or more ranges (e.g., a range to the TRP 300), or a position estimate of the UE 500 (e.g., based on one or more determined ranges to one or more known locations of one or more corresponding positioning signal sources).

At stage 670, the UE 500 may provide position information 672, determined at sub-stage 664, to the server 400 that the server 400 may use to determine the position of the UE 500. For example, if the position information 672 includes the position of the UE 500, then the server 400 may use this as the position of the UE 500 or may use this in combination with other information (e.g., one or more ranges, one or more PRS measurements) to determine the position of the UE 500. As another example, the server 400 may use one or more ranges and/or one or more PRS measurements of the position information 672 to determine the UE 500 location without a UE location being provided in the position information 672. The UE 500 may include with the position information 672 one or more indications that the position information 672 corresponds to a particular combination of positioning methods that was used to determine the position information 672.

Figure 9:
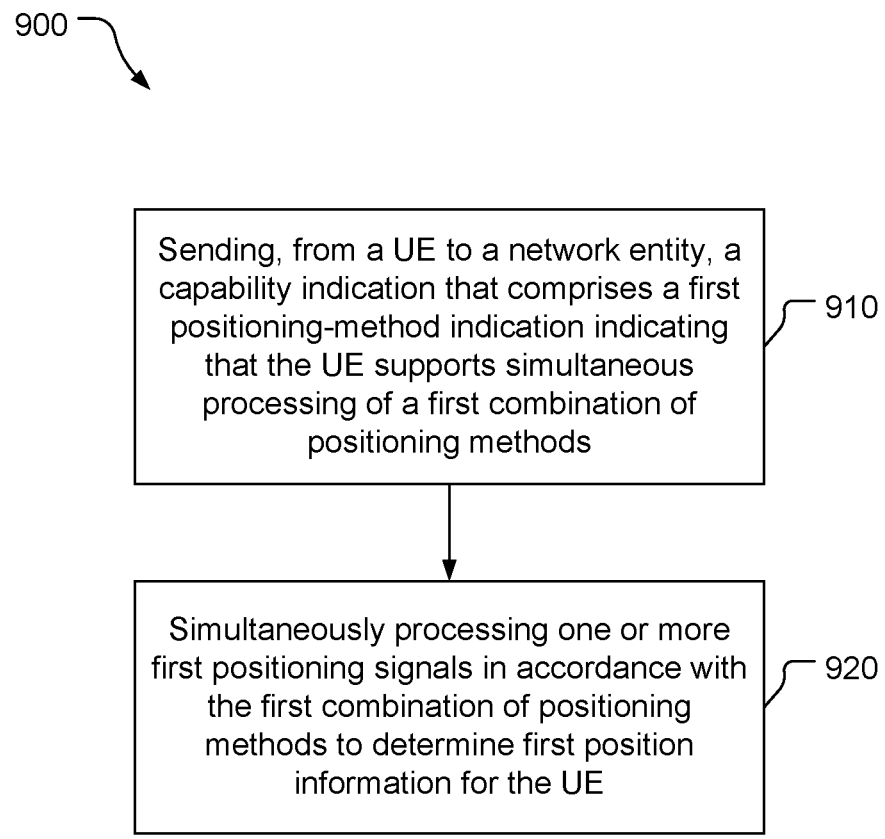
FIG. 9 is a block flow diagram of a method of determining position information.

Referring to FIG. 9, with further reference to FIGS. 1-8, a method 900 of determining position information includes the stages shown. The method 900 is, however, an example only and not limiting. The method 900 may be altered, e.g., by having stages added, removed, rearranged, combined, performed concurrently, and/or having single stages split into multiple stages.

At stage 910, the method 900 includes sending, from a user equipment (UE) to a network entity, a capability indication that comprises a first positioning-method indication indicating that the UE supports simultaneous processing of a first combination of positioning methods. For example, the UE 500 (e.g., the processor 510, possibly in conjunction with the memory 530, and the interface 520) sends the capability message 612 (and/or the capability message 614) to report positioning methods supported by the UE, in particular positioning methods that the UE 500 is configured to support simultaneous processing of to determine position information. The UE 500 (e.g., the processor 510 (e.g., the positioning methods reporting unit 560), possibly in combination with the memory 530, and the interface 520) may, for example, send at least one of the positioning-method indications 721-725 of the capability message 700 to the server 400, and/or the UE 500 may send at least one of the positioning-method indications 821-827 of the capability message 800 to the server 400. The UE 500 may send the capability indication in response to a report trigger. The report trigger may be external to the UE 500, e.g., a request received from the server 400 (e.g., the request 611 or the request 626 shown in FIG. 6), or internal to the UE 500 (e.g., requesting a positioning session or expiration of a timer, etc.). The report trigger may be on demand (e.g., a received request for supported methods, a request for a positioning session by the server 400 or the UE 500) or otherwise, e.g., scheduled (e.g., expiration of a timer). The capability indication may comprise more information than the first positioning-method indication. The processor 510, possibly in conjunction with the memory 530, and the interface 520 may comprise means for sending the capability indication.

At stage 920, the method 900 includes simultaneously processing one or more first positioning signals in accordance with the first combination of positioning methods to determine first position information for the UE. For example, the processor 510 (e.g., the positioning signal processing unit 550) may simultaneously process one or more positioning signals in accordance with multiple (two or more) positioning methods with the processing of the multiple methods overlapping in time, e.g., as shown in sub-stage 664. The processor 510, possibly in conjunction with the memory 530, may comprise means for simultaneously processing one or more positioning signals in accordance with a combination of positioning methods to determine position information for the UE (e.g., location and/or one or more measurements (e.g., RSTD, RSRP, Rx-Tx) for the UE 500)).

Implementations of the method 900 may include one or more of the following features. In an example implementation, the capability indication comprises a first band indication indicating a first frequency band to which the first positioning-method indication is applicable. For example, the UE 500 (e.g., the processor 510, possibly in conjunction with the memory 530) may include at least one of the positioning-method indications 721-725 of the capability message 700, corresponding to the first band indication, in the capability indication, e.g., the capability message 612. In another example implementation, the concurrent support indication comprises: a second positioning-method indication indicating that the UE supports simultaneous processing of a second combination of positioning methods; and a second band indication indicating a second frequency band to which the second positioning-method indication is applicable. For example, the UE 500 (e.g., the processor 510, possibly in conjunction with the memory 530) may include multiple ones of the positioning-method indications 721-725 and corresponding band indications 712, 714 in the capability indication, e.g., of the capability message 612. In another example implementation, the method 900 may comprise: simultaneously processing one or more second positioning signals in accordance with the second combination of positioning methods to determine second position information for the UE; reporting to the network entity that the second position information for the UE comprises one or more measurements corresponding to the second combination of positioning methods. The processor 510, possibly in combination with the memory 530, may comprise means for simultaneously processing the one or more second positioning signals in accordance with the second combination of positioning methods. The processor 510, possibly in combination with the memory 530, and the interface 520 (e.g., the wireless transmitter 242 and the antenna 246) may comprise means for reporting that the second position information comprises one or more measurements corresponding to the second combination of positioning methods.

Also or alternatively, the method 900 may include one or more of the following features. In an example implementation, the capability indication indicates position-processing capabilities of the UE corresponding to the first combination of positioning methods. For example, the UE 500 (e.g., the processor 510, possibly in conjunction with the memory 530) may include the position-processing-capabilities indication 733 corresponding to the combination of methods in the positioning-method indication 723 in the capability message 700, and/or may include the position-processing-capabilities indication 831 corresponding to the combination of methods in the positioning-method indication 823 in the capability message 800. In another example implementation, the capability indication comprises a first position-processing capabilities indication, corresponding to a first positioning method of the first combination of positioning methods, and a second position-processing capabilities indication, corresponding to a second positioning method of the first combination of positioning methods. For example, the UE 500 (e.g., the processor 510, possibly in conjunction with the memory 530) may include the position-processing-capabilities indication 733 and/or the position-processing-capabilities indications 735, 736 corresponding to the combinations of methods in the positioning-method indications 723, 725, respectively, in the capability message 700, and/or may include may include the position-processing-capabilities indication 831 and/or the position-processing-capabilities indications 834, 834 corresponding to the combinations of methods in the positioning-method indications 823, 825, respectively, in the capability message 800.

Also or alternatively, the method 900 may include one or more of the following features. In an example implementation, the first combination of positioning methods comprises a first positioning method and a second positioning method, and wherein the capability indication comprises a third positioning-method indication indicating a third positioning method that the UE is configured to implement without simultaneously implementing the first positioning method or the second positioning method. For example, the UE 500 (e.g., the processor 510, possibly in conjunction with the memory 530) may include a positioning-method indication, such as the positioning-method indication 721 or the positioning-method indication 821, indicating a positioning method that the processor 510 may implement without implementing another method (although it may be possible to implement this method with another method, e.g., as indicated by the positioning-method indication 723 or the positioning-method indication 825). In another example, implementation, the first positioning method, the second positioning method, and the third positioning method are all different positioning methods.

Also or alternatively, the method 900 may include one or more of the following features. In an example implementation, the capability indication comprises a first band-combination indication indicating a first carrier aggregation frequency band combination to which the first positioning-method indication is applicable. For example, the UE 500 (e.g., the processor 510, possibly in conjunction with the memory 530) may include the frequency-band-combination indication 812 associated with the positioning-method indication 821. In another example implementation, the capability indication comprises: a second positioning-method indication indicating that the UE supports simultaneous processing of a second combination of positioning methods; and a second band-combination indication indicating a second carrier aggregation frequency band combination to which the second positioning-method indication is applicable. For example, the UE 500 (e.g., the processor 510, possibly in conjunction with the memory 530) may include multiple frequency-band-combination indications each associated with at least one corresponding positioning-method indication, e.g., in the capability message 800 the frequency-band-combination indications 812, 814, 816 being associated with respective ones of the positioning-method indications 821-827. In another example implementation, the first combination of positioning methods comprises a first positioning method and a second positioning method, and wherein the capability indication indicates position-processing capabilities of the UE corresponding to each of the first positioning method and the second positioning method. For example, the UE 500 (e.g., the processor 510, possibly in conjunction with the memory 530) may provide position-processing capabilities per method combination, e.g., the position-processing-capabilities indication 831 applying to the method combination indicated by the positioning-method indication 823, where the capabilities apply equally to each of the methods indicated by the positioning-method indication 823. In another example implementation, the first combination of positioning methods comprises a first positioning method and a second positioning method, and wherein the capability indication indicates position-processing capabilities of the UE corresponding to the first positioning method and the second positioning method combined. For example, the UE 500 (e.g., the processor 510, possibly in conjunction with the memory 530) may provide position-processing capabilities per method combination, e.g., the position-processing-capabilities indication 831 applying to the method combination indicated by the positioning-method indication 823, where the capabilities apply to the combined needs of the methods indicated by the positioning-method indication 823. In another example implementation, the first combination of positioning methods comprises a first positioning method and a second positioning method, and wherein the capability indication indicates first position-processing capabilities of the UE corresponding to the first positioning method and second position-processing capabilities of the UE corresponding to the second positioning method. For example, the UE 500 (e.g., the processor 510, possibly in conjunction with the memory 530) may provide multiple position-processing-capabilities indications per method combination, e.g., the position-processing-capabilities indications 833, 834 applying to the method combination indicated by the positioning-method indication 825, where the capabilities of the position-processing-capabilities indication 833 apply to the first-listed method in the combination indicated by the positioning-method indication 825 and the capabilities of the position-processing-capabilities indication 834 apply to the second-listed method in the combination indicated by the positioning-method indication 825. A capabilities indication could be provided for each method in the combination, which may exceed two methods. One or more of the capabilities of the different capability indications may be different. With three or more methods in a method combination, multiple methods may have the same capabilities while at least one method may have a different set of capabilities (i.e., at least one capability value being different from the other sets of capabilities).

Also or alternatively, the method 900 may include one or more of the following features. In an example implementation, the first combination of positioning methods comprises at least two of downlink time difference of arrival (DL-TDOA), angle of departure (AoD), angle of arrival (AoA), and multiple round-trip time (multi-RTT). Thus, the combination of positioning methods may include any two of these methods, or any three of these methods, or all four of these methods. In another example implementation, the first combination of positioning methods comprises AoD and DL-TDOA, the capability indication comprises a second positioning-method indication indicating that the UE supports simultaneous processing of a second combination of positioning methods, and the second combination of positioning methods comprises multi-RTT and AoD.

Also or alternatively, the method 900 may include one or more of the following features. In an example implementation, the method 900 includes reporting to the network entity that the first position information for the UE corresponds to the first combination of positioning methods. For example, the UE 500 may include one or more indications along with the position information 672 that the position information 672 corresponds to the combination of positioning methods used to determine the position information 672. The processor 510, possibly in combination with the memory 530, and the interface 520 (e.g., the wireless transmitter 242 and the antenna 246) may comprise means for reporting that the first position information corresponds to the first combination of positioning methods. In another example implementation, the network entity is a location server.

Other Considerations

Other examples and implementations are within the scope of the disclosure and appended claims. For example, due to the nature of software and computers, functions described above can be implemented using software executed by a processor, hardware, firmware, hardwiring, or a combination of any of these. Features implementing functions may also be physically located at various positions, including being distributed such that portions of functions are implemented at different physical locations. Components, functional or otherwise, shown in the figures and/or discussed herein as being connected or communicating with each other are communicatively coupled unless otherwise noted. That is, they may be directly or indirectly connected to enable communication between them.

As used herein, the singular forms "a," "an," and "the" include the plural forms as well, unless the context clearly indicates otherwise. The terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

Also, as used herein, "or" as used in a list of items prefaced by "at least one of" or prefaced by "one or more of" indicates a disjunctive list such that, for example, a list of "at least one of A, B, or C," or a list of "one or more of A, B, or C" means A, or B, or C, or AB (A and B), or AC (A and C), or BC (B and C), or ABC (i.e., A and B and C), or combinations with more than one feature (e.g., AA, AAB, ABBC, etc.). Thus, a recitation that an item, e.g., a processor, is configured to perform a function regarding at least one of A or B means that the item may be configured to perform the function regarding A, or may be configured to perform the function regarding B, or may be configured to perform the function regarding A and B. For example, a phrase of "a processor configured to measure at least one of A or B" means that the processor may be configured to measure A (and may or may not be configured to measure B), or may be configured to measure B (and may or may not be configured to measure A), or may be configured to measure A and measure B (and may be configured to select which, or both, of A and B to measure). Similarly, a recitation of a means for measuring at least one of A or B includes means for measuring A (which may or may not be able to measure B), or means for measuring B (and may or may not be configured to measure A), or means for measuring A and B (which may be able to select which, or both, of A and B to measure). As another example, a recitation that an item, e.g., a processor, is configured to at least one of perform function X or perform function Y means that the item may be configured to perform the function X, or may be configured to perform the function Y, or may be configured to perform the function X and to perform the function Y. For example, a phrase of "a processor configured to at least one of measure X or measure Y" means that the processor may be configured to measure X (and may or may not be configured to measure Y), or may be configured to measure Y (and may or may not be configured to measure X), or may be configured to measure X and to measure Y (and may be configured to select which, or both, of X and Y to measure).

Substantial variations may be made in accordance with specific requirements. For example, customized hardware might also be used, and/or particular elements might be implemented in hardware, software (including portable software, such as applets, etc.) executed by a processor, or both. Further, connection to other computing devices such as network input/output devices may be employed.

The systems and devices discussed above are examples. Various configurations may omit, substitute, or add various procedures or components as appropriate. For instance, features described with respect to certain configurations may be combined in various other configurations. Different aspects and elements of the configurations may be combined in a similar manner. Also, technology evolves and, thus, many of the elements are examples and do not limit the scope of the disclosure or claims.

As used herein, unless otherwise stated, a statement that a function or operation is "based on" an item or condition means that the function or operation is based on the stated item or condition and may be based on one or more items and/or conditions in addition to the stated item or condition.

A wireless communication system is one in which communications are conveyed wirelessly, i.e., by electromagnetic and/or acoustic waves propagating through atmospheric space rather than through a wire or other physical connection. A wireless communication network may not have all communications transmitted wirelessly, but is configured to have at least some communications transmitted wirelessly. Further, the term "wireless communication device," or similar term, does not require that the functionality of the device is exclusively, or evenly primarily, for communication, or that the device be a mobile device, but indicates that the device includes wireless communication capability (one-way or two-way), e.g., includes at least one radio (each radio being part of a transmitter, receiver, or transceiver) for wireless communication.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations provides a description for implementing described techniques. Various changes may be made in the function and arrangement of elements without departing from the scope of the disclosure.

The terms "processor-readable medium," "machine-readable medium," and "computer-readable medium," as used herein, refer to any medium that participates in providing data that causes a machine to operate in a specific fashion. Using a computing platform, various processor-readable media might be involved in providing instructions/code to processor(s) for execution and/or might be used to store and/or carry such instructions/code (e.g., as signals). In many implementations, a processor-readable medium is a physical and/or tangible storage medium. Such a medium may take many forms, including but not limited to, non-volatile media and volatile media. Non-volatile media include, for example, optical and/or magnetic disks. Volatile media include, without limitation, dynamic memory.

Having described several example configurations, various modifications, alternative constructions, and equivalents may be used without departing from the scope of the disclosure. For example, the above elements may be components of a larger system, wherein other rules may take precedence over or otherwise modify the application of the invention. Also, a number of operations may be undertaken before, during, or after the above elements are considered. Accordingly, the above description does not bound the scope of the claims.

A statement that a value exceeds (or is more than or above) a first threshold value is equivalent to a statement that the value meets or exceeds a second threshold value that is slightly greater than the first threshold value, e.g., the second threshold value being one value higher than the first threshold value in the resolution of a computing system. A statement that a value is less than (or is within or below) a first threshold value is equivalent to a statement that the value is less than or equal to a second threshold value that is slightly lower than the first threshold value, e.g., the second threshold value being one value lower than the first threshold value in the resolution of a computing system.

The invention claimed is:
1. A user equipment (UE) comprising:
a transceiver configured to receive positioning signals;
a memory; and
a processor, communicatively coupled to the transceiver and the memory, configured to:
send, via the transceiver to a network entity, a capability indication that comprises a first positioning-method indication indicating that the processor supports simultaneous processing of a first combination of identified positioning methods, the simultaneous processing including measuring of one or more positioning signals at least partially overlapping in time to determine respective measurements for the first combination of positioning methods, the at least partially overlapping in time comprising at least a portion of a first measurement operation of a first of the identified positioning methods performed at the same time as a second measurement operation of a second of the identified positioning methods or performed between the second measurement operation and a third measurement operation of the second of the identified positioning methods; and
simultaneously process one or more first positioning signals in accordance with the first combination of positioning methods to determine first position information for the UE.
2. The UE of claim 1, wherein the capability indication comprises a first band indication indicating a first frequency band to which the first positioning-method indication is applicable.
3. The UE of claim 2, wherein the capability indication comprises:
a second positioning-method indication indicating that the processor supports simultaneous processing of a second combination of positioning methods; and
a second band indication indicating a second frequency band to which the second positioning-method indication is applicable;
wherein the processor is configured to simultaneously process one or more second positioning signals in accordance with the second combination of positioning methods to determine second position information for the UE.
4. The UE of claim 3, wherein the processor is further configured to report to the network entity that the second position information for the UE comprises one or more measurements corresponding to the second combination of positioning methods.
5. The UE of claim 1, wherein the capability indication indicates position-processing capabilities of the UE corresponding to the first combination of positioning methods.
6. The UE of claim 5, wherein the capability indication comprises a first position-processing capabilities indication, corresponding to a first positioning method of the first combination of positioning methods, and a second position-processing capabilities indication, corresponding to a second positioning method of the first combination of positioning methods.
7. The UE of claim 1, wherein the first combination of positioning methods comprises a first positioning method and a second positioning method, and wherein the capability indication comprises a third positioning-method indication indicating a third positioning method that the processor is configured to implement without simultaneously implementing the first positioning method or the second positioning method.
8. The UE of claim 7, wherein the first positioning method, the second positioning method, and the third positioning method are all different positioning methods.
9. The UE of claim 1, wherein the capability indication comprises a first band-combination indication indicating a first carrier aggregation frequency band combination to which the first positioning-method indication is applicable.
10. The UE of claim 9, wherein the capability indication comprises:
a second positioning-method indication indicating that the processor supports simultaneous processing of a second combination of positioning methods; and
a second band-combination indication indicating a second carrier aggregation frequency band combination to which the second positioning-method indication is applicable.
11. The UE of claim 9, wherein the first combination of positioning methods comprises a first positioning method and a second positioning method, and wherein the capability indication indicates position-processing capabilities of the UE corresponding to each of the first positioning method and the second positioning method.
12. The UE of claim 9, wherein the first combination of positioning methods comprises a first positioning method and a second positioning method, and wherein the capability indication indicates position-processing capabilities of the UE corresponding to the first positioning method and the second positioning method combined.
13. The UE of claim 9, wherein the first combination of positioning methods comprises a first positioning method and a second positioning method, and wherein the capability indication indicates first position-processing capabilities of the UE corresponding to the first positioning method and second position-processing capabilities of the UE corresponding to the second positioning method.
14. The UE of claim 1, wherein the first combination of positioning methods comprises at least two of downlink time difference of arrival (DL-TDOA), angle of departure (AoD), angle of arrival (AoA), and multiple round-trip time (multi-RTT).
15. The UE of claim 14, wherein the first combination of positioning methods comprises AoD and DL-TDOA, wherein the capability indication comprises a second positioning-method indication indicating that the processor supports simultaneous processing of a second combination of positioning methods, and wherein the second combination of positioning methods comprises multi-RTT and AoD.
16. The UE of claim 1, wherein the processor is further configured to report to the network entity that the first position information for the UE corresponds to the first combination of positioning methods.
17. A method of determining position information, the method comprising:
sending, from a user equipment (UE) to a network entity, a capability indication that comprises a first positioning-method indication indicating that the UE supports simultaneous processing of a first combination of identified positioning methods, the simultaneous processing including measuring of one or more positioning signals at least partially overlapping in time to determine respective measurements for the first combination of positioning methods, the at least partially overlapping in time comprising at least a portion of a first measurement operation of a first of the identified positioning methods performed at the same time as a second measurement operation of a second of the identified positioning methods or performed between the second measurement operation and a third measurement operation of the second of the identified positioning methods; and simultaneously processing one or more first positioning signal measurements in accordance with the first combination of positioning methods to determine first position information for the UE.

18. The method of claim 17, wherein the capability indication comprises a first band indication indicating a first frequency band to which the first positioning-method indication is applicable.

19. The method of claim 18, wherein the capability indication comprises:
a second positioning-method indication indicating that the UE supports simultaneous processing of a second combination of positioning methods; and
a second band indication indicating a second frequency band to which the second positioning-method indication is applicable.

20. The method of claim 19, further comprising:
simultaneously processing one or more second positioning signals in accordance with the second combination of positioning methods to determine second position information for the UE; and
reporting to the network entity that the second position information for the UE comprises one or more measurements corresponding to the second combination of positioning methods.

21. The method of claim 17, wherein the capability indication indicates position-processing capabilities of the UE corresponding to the first combination of positioning methods.

22. The method of claim 21, wherein the capability indication comprises a first position-processing capabilities indication, corresponding to a first positioning method of the first combination of positioning methods, and a second position-processing capabilities indication, corresponding to a second positioning method of the first combination of positioning methods.

23. The method of claim 17, wherein the first combination of positioning methods comprises a first positioning method and a second positioning method, and wherein the capability indication comprises a third positioning-method indication indicating a third positioning method that the UE is configured to implement without simultaneously implementing the first positioning method or the second positioning method.

24. The method of claim 23, wherein the first positioning method, the second positioning method, and the third positioning method are all different positioning methods.

25. The method of claim 17, wherein the capability indication comprises a first band-combination indication indicating a first carrier aggregation frequency band combination to which the first positioning-method indication is applicable.

26. The method of claim 25, wherein the capability indication comprises:
a second positioning-method indication indicating that the UE supports simultaneous processing of a second combination of positioning methods; and
a second band-combination indication indicating a second carrier aggregation frequency band combination to which the second positioning-method indication is applicable.

27. The method of claim 25, wherein the first combination of positioning methods comprises a first positioning method and a second positioning method, and wherein the capability indication indicates position-processing capabilities of the UE corresponding to each of the first positioning method and the second positioning method.

28. The method of claim 25, wherein the first combination of positioning methods comprises a first positioning method and a second positioning method, and wherein the capability indication indicates position-processing capabilities of the UE corresponding to the first positioning method and the second positioning method combined.

29. The method of claim 25, wherein the first combination of positioning methods comprises a first positioning method and a second positioning method, and wherein the capability indication indicates first position-processing capabilities of the UE corresponding to the first positioning method and second position-processing capabilities of the UE corresponding to the second positioning method.

30. The method of claim 17, wherein the first combination of positioning methods comprises at least two of downlink time difference of arrival (DL-TDOA), angle of departure (AoD), angle of arrival (AoA), and multiple round-trip time (multi-RTT).

31. The method of claim 17, wherein the first combination of positioning methods comprises AoD and DL-TDOA, wherein the capability indication comprises a second positioning-method indication indicating that the UE supports simultaneous processing of a second combination of positioning methods, and wherein the second combination of positioning methods comprises multi-RTT and AoD.

32. The method of claim 17, further comprising reporting to the network entity that the first position information for the UE corresponds to the first combination of positioning methods.

33. The method of claim 17, wherein the network entity is a location server.

34. A user equipment (UE) comprising:
capability means for sending, to a network entity, a capability indication that comprises a first positioning-method indication indicating that the UE supports simultaneous processing of a first combination of identified positioning methods, the simultaneous processing including measuring of one or more positioning signals at least partially overlapping in time to determine respective measurements for the first combination of positioning methods, the at least partially overlapping in time comprising at least a portion of a first measurement operation of a first of the identified positioning methods performed at the same time as a second measurement operation of a second of the identified positioning methods or performed between the second measurement operation and a third measurement operation of the second of the identified positioning methods; and
positioning means for simultaneously processing one or more first positioning signals in accordance with the first combination of positioning methods to determine first position information for the UE.

35. The UE of claim 34, wherein the capability indication comprises a first band indication indicating a first frequency band to which the first positioning-method indication is applicable.

36. The UE of claim 34, wherein the capability indication comprises a first band-combination indication indicating a first carrier aggregation frequency band combination to which the first positioning-method indication is applicable.

37. A non-transitory, processor-readable storage medium comprising processor-readable instructions to cause a processor of a user equipment (UE) to:
- send, to a network entity, a capability indication that comprises a first positioning-method indication indicating that the UE supports simultaneous processing of a first combination of identified positioning methods, the simultaneous processing including measuring of one or more positioning signals at least partially overlapping in time to determine respective measurements for the first combination of positioning methods, the at least partially overlapping in time comprising at least a portion of a first measurement operation of a first of the identified positioning methods performed at the same time as a second measurement operation of a second of the identified positioning methods or performed between the second measurement operation and a third measurement operation of the second of the identified positioning methods; and
- simultaneously process one or more first positioning signals in accordance with the first combination of positioning methods to determine first position information for the UE.

38. The storage medium of claim 37, wherein the instructions further comprise instructions to cause the processor to report to the network entity that the first position information for the UE corresponds to the first combination of positioning methods.

* * * * *